United States Patent
Matsusue et al.

(10) Patent No.: US 9,223,108 B2
(45) Date of Patent: Dec. 29, 2015

(54) OPTICAL MODULE AND MANUFACTURING METHOD THEREOF

(71) Applicant: Mitsubishi Electric Corporation, Tokyo (JP)

(72) Inventors: Akihiro Matsusue, Tokyo (JP); Koichi Nakamura, Tokyo (JP); Hidekazu Kodera, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/293,059

(22) Filed: Jun. 2, 2014

(65) Prior Publication Data

US 2015/0085388 A1    Mar. 26, 2015

(30) Foreign Application Priority Data

Sep. 24, 2013    (JP) ................. 2013-197214

(51) Int. Cl.
*G02B 7/02*    (2006.01)

(52) U.S. Cl.
CPC *G02B 7/028* (2013.01); *G02B 7/02* (2013.01); *G02B 7/021* (2013.01)

(58) Field of Classification Search
CPC ........... G02B 7/02; G02B 7/021; G02B 7/028
USPC ................................... 359/811, 819
See application file for complete search history.

(56) References Cited

U.S. PATENT DOCUMENTS

| 5,315,609 A | 5/1994 | Tanaka et al. |
| 2006/0114580 A1* | 6/2006 | Mori ............ G02B 7/028 359/819 |

FOREIGN PATENT DOCUMENTS

| JP | 5-127050 A | 5/1993 |
| JP | 8-241933 A | 9/1996 |
| JP | 2003-322755 A | 11/2003 |
| JP | 2009-37055 A | 2/2009 |

* cited by examiner

*Primary Examiner* — William Choi
(74) *Attorney, Agent, or Firm* — Leydig, Voit & Mayer, Ltd.

(57) ABSTRACT

An optical module and a manufacturing method improve positioning accuracy between parts. A barrel and a lens holder are prepared, the lens holder is fitted into a cylindrical portion from a collar portion side of the barrel, and the barrel and the lens holder are assembled. In one case, the barrel and the lens holder are assembled with a brazing material. The assembled barrel and lens holder are heated, and the brazing material is melted to braze the barrel and the lens holder. Lens glass is sandwiched between metal dies and a lens is press-molded using a pressing apparatus. In one case, positioning of press molding uses the barrel which has a small linear expansion coefficient.

17 Claims, 30 Drawing Sheets

Fig. 3
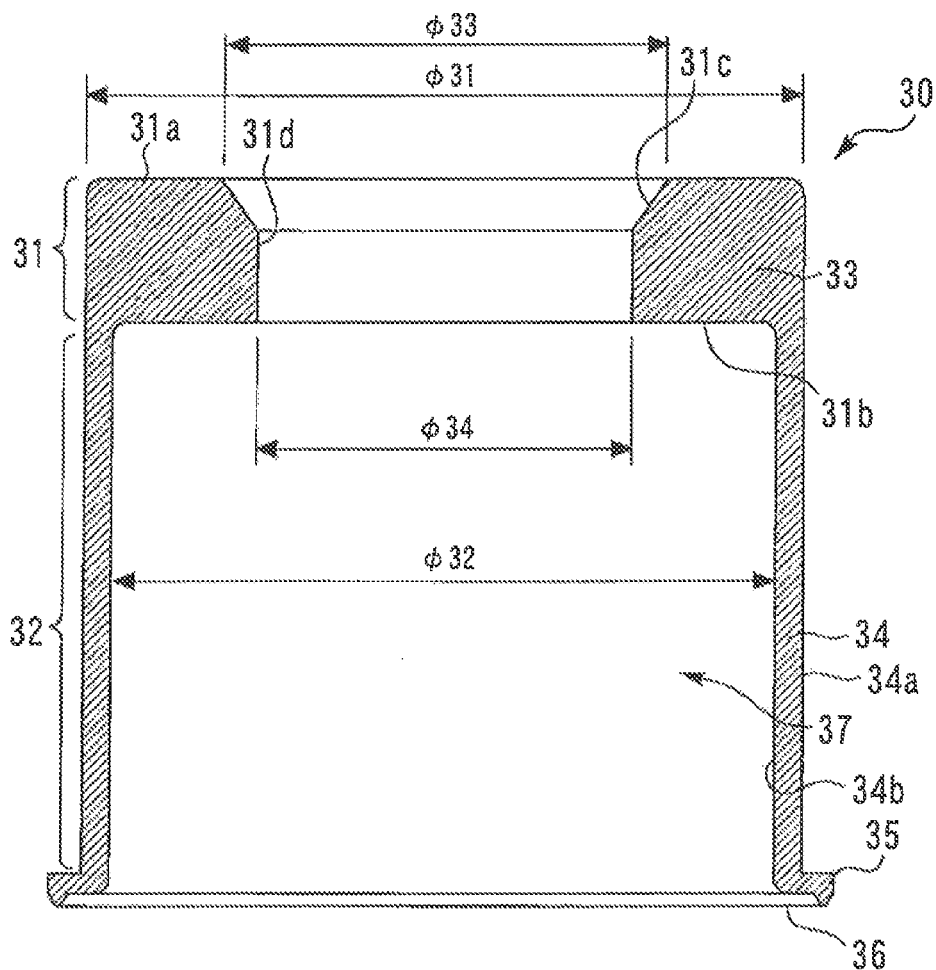
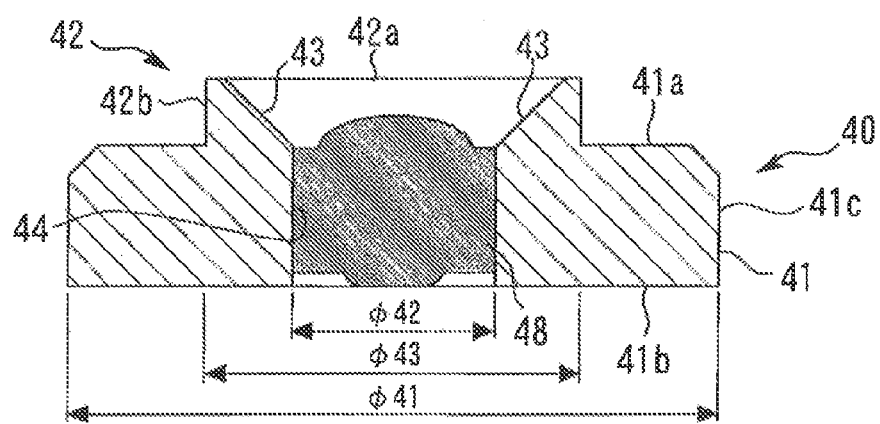

Fig. 8
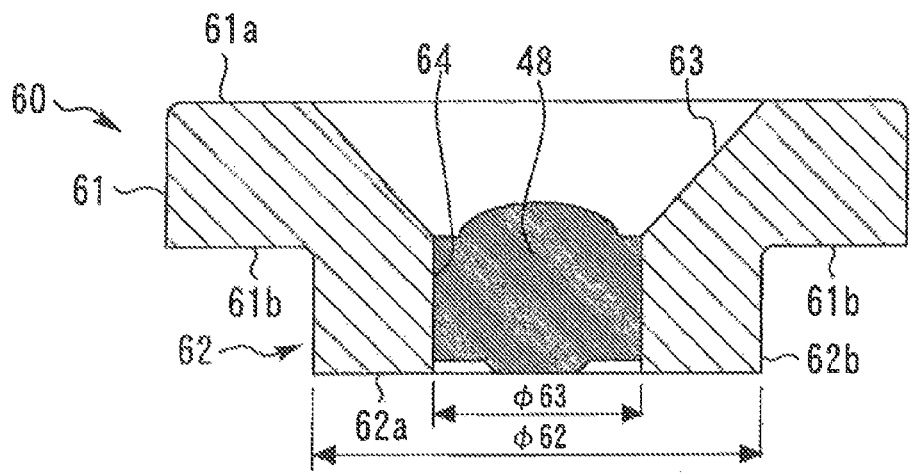
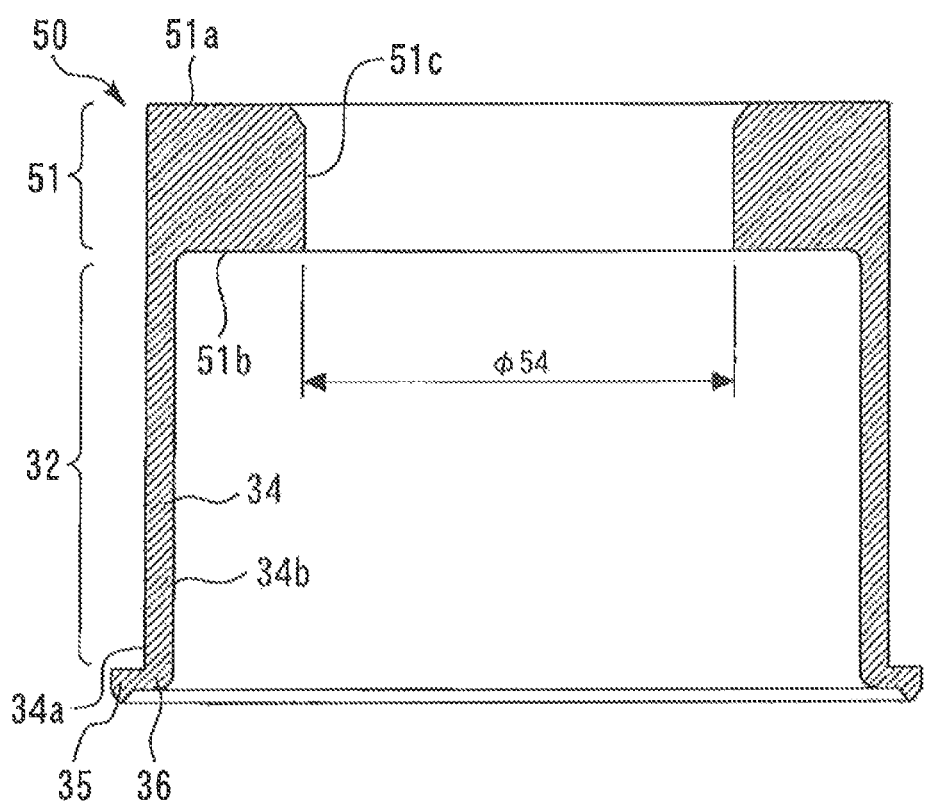

Fig. 12
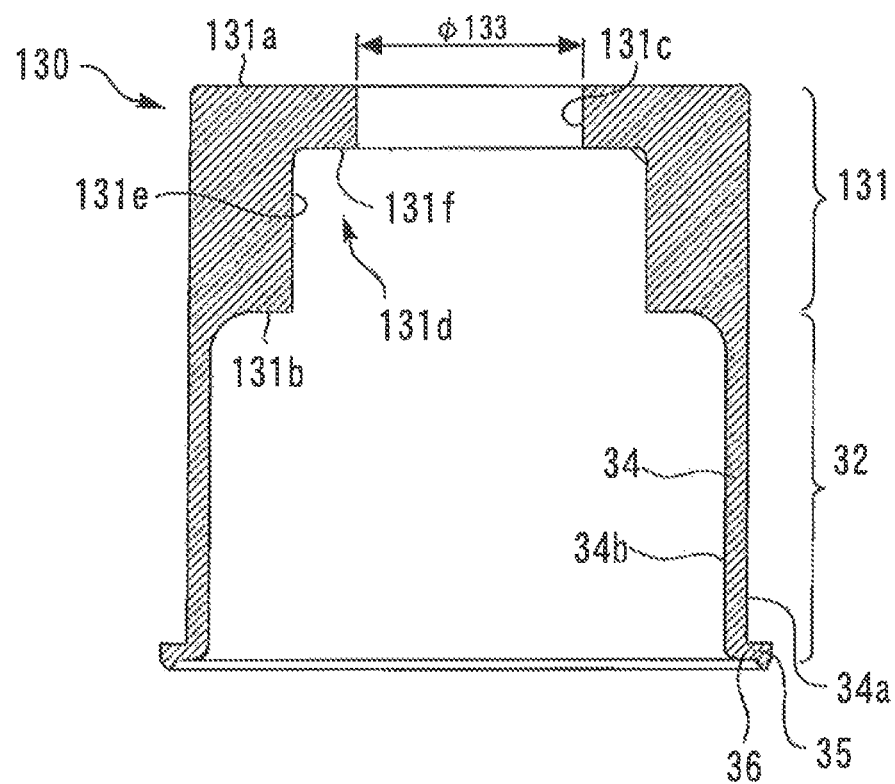
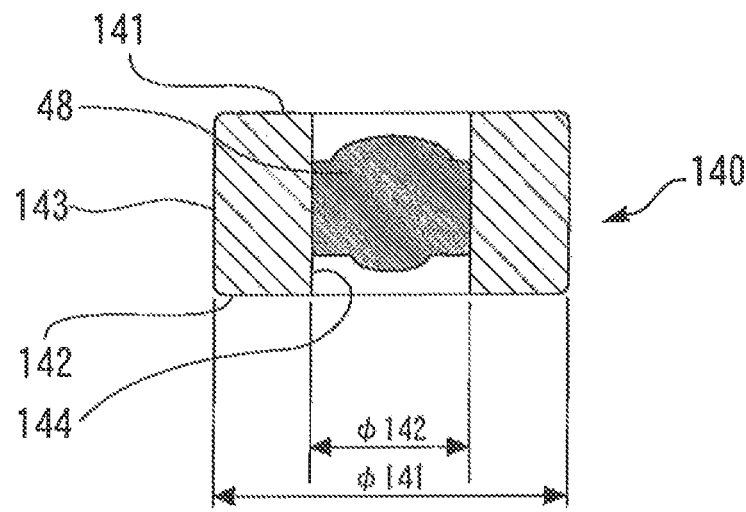

Fig. 14
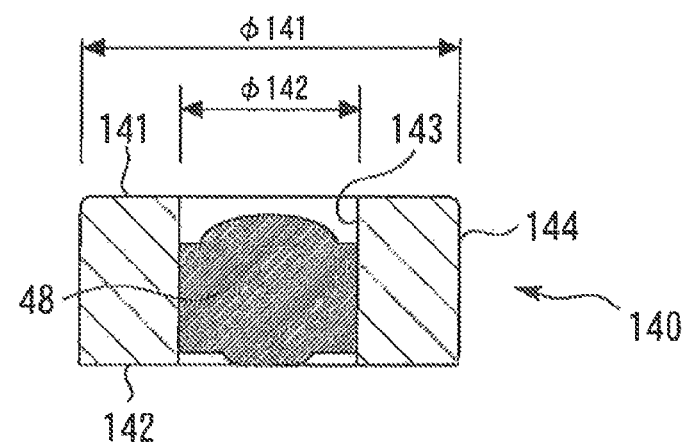
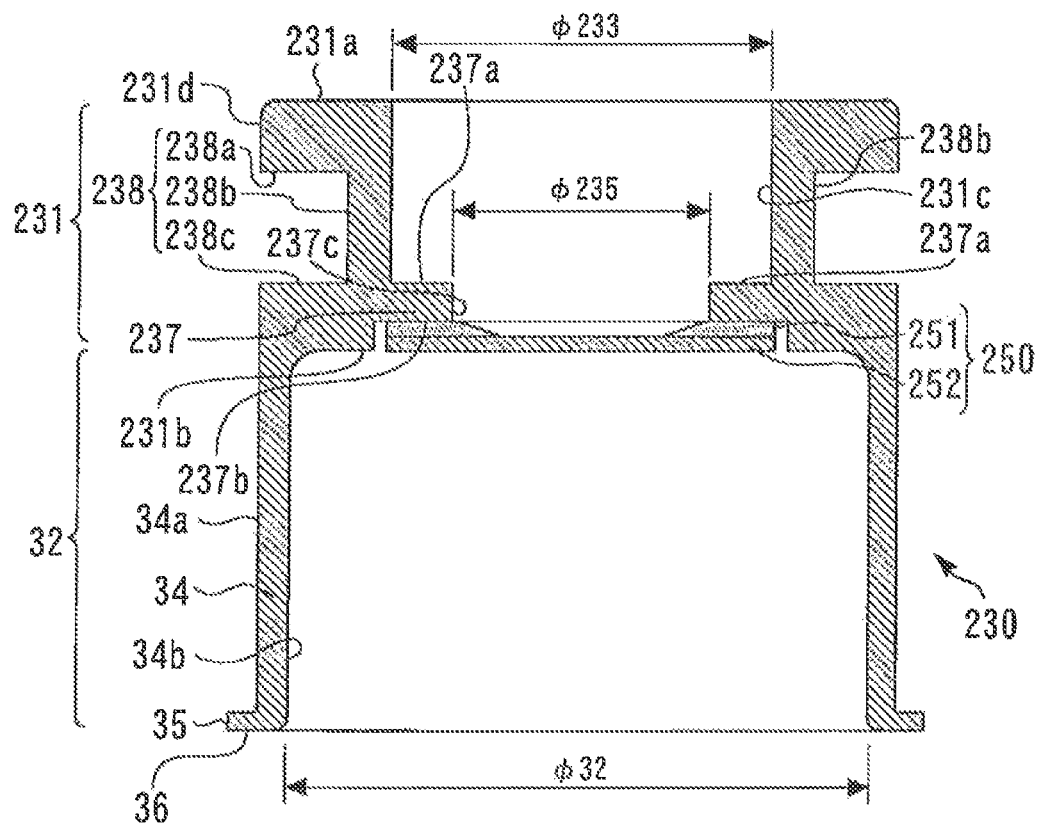

OPTICAL MODULE AND MANUFACTURING METHOD THEREOF

BACKGROUND OF THE INVENTION

1. Field of the Invention

The present invention relates to an optical module and a manufacturing method thereof.

2. Background Art

Conventionally, as is disclosed, for example, in Japanese Patent Laid-Open No. 5-127050, an optical module is known which is provided with a lens cap combining a plurality of parts having mutually different linear expansion coefficients. The lens cap is a part that holds a lens. According to this Patent document, as measures for thermal fatigue, a lens holder contacting the lens is formed of pure iron and a holding part that holds this lens holder is formed of Kovar (registered trademark), and these components are soldered into one lens cap.

According to such a configuration, the lens holder has a larger linear expansion coefficient than that of the holding part. Thus, the lens cap has a two-division structure, that is, the lens cap is constructed of two parts and the two parts are formed of mutually different materials. For a package connection part, the same material as the package material is used and for a lens connection part, a material having a thermal expansion coefficient similar to that of the lens is used.

Other prior art includes Japanese Patent Laid-Open No. 5-127050, Japanese Patent Laid-Open No. 2009-37055, Japanese Patent Laid-Open No. 2003-322755, Japanese Patent Laid-Open No. 8-241933.

A lens is attached to a lens cap, for example, by soldering the lens to the lens cap or by molding the lens into the lens cap through press molding. In the latter press molding method in particular, air tightness between the lens cap and the lens can be enhanced through thermal caulking utilizing a difference between a linear expansion coefficient of the lens cap and a linear expansion coefficient of the lens glass.

Lens cap manufacturing steps include steps carried out under a high-temperature atmosphere and press molding of the lens is one of those steps. When combining a plurality of parts having mutually different linear expansion coefficients into one lens cap as in the case of the above-described prior art, it should be noted that the amount of thermal expansion varies among the parts under the high-temperature atmosphere. None of the conventional manufacturing methods attaches importance to this respect and a positional variation of the lens may increase due to the difference in the amount of thermal expansion.

Furthermore, when a plurality of parts having mutually different linear expansion coefficients are combined into one lens cap as in the case of the above-described prior art, scales of gaps among a plurality of parts change due to differences in the amount of thermal expansion. Under such circumstances, the present inventors discovered a technique of improving positioning accuracy utilizing a difference in the amount of thermal expansion among parts under a high-temperature atmosphere by adjusting relationships of linear expansion coefficients among components and shapes of the respective components of the lens cap.

SUMMARY OF THE INVENTION

The present invention has been implemented to solve the aforementioned problems and it is an object of the present invention to provide a method for manufacturing an optical module capable of preventing a positional variation of a lens while securing high air tightness.

It is another object of the present invention to provide a method for manufacturing an optical module capable of improving positioning accuracy among parts.

It is a further object of the present invention to provide an optical module with improved positioning accuracy among parts.

According to a first aspect of the present invention, a method for manufacturing an optical module, includes: a preparation step, an assembly step, and a lens molding step. The preparation step prepares a barrel and a lens holder. The barrel includes a cylindrical portion and a cover portion provided at one end of the cylindrical portion and provided with a through hole, the other end of the cylindrical portion is left open, the barrel is formed of a material having a first linear expansion coefficient, and a lens holder includes a lens mounting hole and is formed of a material having a second linear expansion coefficient larger than the first linear expansion coefficient. The assembly step assembles the barrel and the lens holder so that the through hole is aligned with the lens mounting hole. The lens molding step performs press-molding lens glass having a third linear expansion coefficient which is smaller than the second linear expansion coefficient into the lens mounting hole while positioning the assembled barrel and lens holder using the barrel, cooling the press-molded lens glass and thereby providing a lens in the lens holder.

According to a second aspect of the present invention, a method for manufacturing an optical module, includes: a preparation step, an assembly step, and a lens molding step. The preparation step prepares a barrel and a lens holder. The barrel includes a cylindrical portion and a cover portion provided at one end of the cylindrical portion and provided with a through hole, the other end of the cylindrical portion is left open, the barrel is formed of a material having a first linear expansion coefficient, and a lens holder includes a lens mounting hole and is formed of a material having a second linear expansion coefficient larger than the first linear expansion coefficient. The assembly step assembles the barrel and the lens holder so that the through hole is aligned with the lens mounting hole. The lens molding step includes providing a lens in the lens holder before or after the assembly step. The lens holder includes a convex portion along a rim of the lens mounting hole, and the convex portion is fitted into the through hole.

According to a third aspect of the present invention, a method for manufacturing an optical module, includes] a preparation step, an assembly step, and a lens molding step. The preparation step prepares a barrel and a lens holder. The barrel includes a cylindrical portion and a cover portion provided at one end of the cylindrical portion and provided with a through hole, the other end of the cylindrical portion is left open, the barrel is formed of a material having a first linear expansion coefficient, and a lens holder includes a lens mounting hole and is formed of a material having a second linear expansion coefficient larger than the first linear expansion coefficient. The assembly step assembles the barrel and the lens holder so that the through hole is aligned with the lens mounting hole. The lens molding step performs providing a lens in the lens holder before or after the assembly step. A concave portion is provided in the cover portion, and a part or whole of the lens holder is fitted into the concave portion.

According to a fourth aspect of the present invention, an optical module includes: a barrel, a lens holder, a lens, and a stem. The barrel includes a cylindrical portion and a cover portion provided at one end of the cylindrical portion, the cover portion is provided with a through hole, the other end of the cylindrical portion is left open, and the barrel is formed of a material having a first linear expansion coefficient. The lens holder includes a lens mounting hole and is formed of a material having a second linear expansion coefficient which is larger than the first linear expansion coefficient. The lens is provided by press molding lens glass having a third linear expansion coefficient which is smaller than the second linear expansion coefficient into the lens mounting hole. The stem includes a top surface and an optical element provided on the top surface, the optical element is covered with the barrel, and the other end is connected to the top surface. The lens holder comprises a convex portion along a rim of the lens mounting hole, and the convex portion is fitted into the through hole.

According to a fifth aspect of the present invention, an optical module includes: a barrel, a lens holder, a lens, and a stem. The barrel includes a cylindrical portion and a cover portion provided at one end of the cylindrical portion, the cover portion is provided with a through hole, the other end of the cylindrical portion is left open, and the barrel is formed of a material having a first linear expansion coefficient. The lens holder includes a lens mounting hole and is formed of a material having a second linear expansion coefficient which is larger than the first linear expansion coefficient. The lens is provided by press molding lens glass having a third linear expansion coefficient which is smaller than the second linear expansion coefficient into the lens mounting hole. The stem includes a top surface and an optical element provided on the top surface, the optical element is covered with the barrel, and the other end is connected to the top surface. A concave portion is provided in the cover portion, and a part or whole of the lens holder is fitted into the concave portion.

Other and further objects, features and advantages of the invention will appear more fully from the following description.

BRIEF DESCRIPTION OF DRAWING FIGURES

FIG. 3 is an exploded view illustrating the optical module lens cap according to the first embodiment of the present invention.

FIGS. 5A, 5B, 5C, 5D, and 5E are time sequence diagrams illustrating manufacturing processes of the optical module according to the first embodiment of the present invention.

Figure 6:
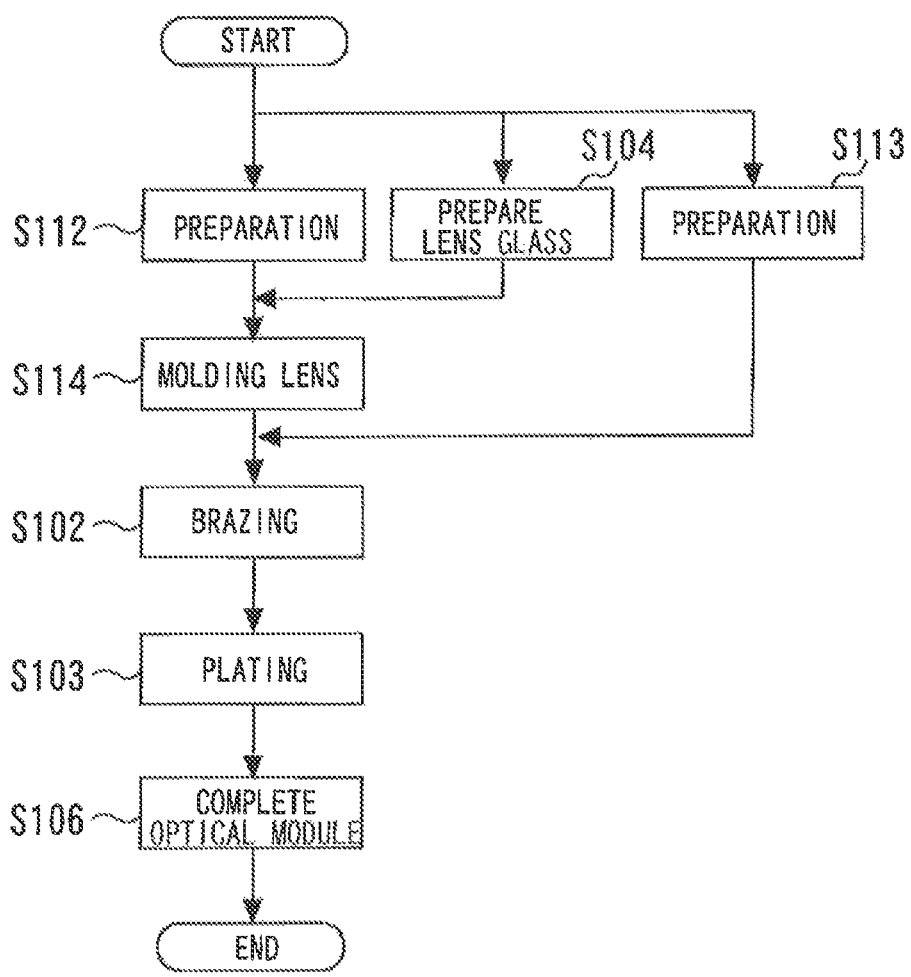

FIG. 6 is a flowchart illustrating a method for manufacturing the optical module according to the second embodiment of the present invention.

FIGS. 7A, 7B, 7C, and 7D are time sequence diagrams illustrating manufacturing processes of the optical module according to the second embodiment of the present invention.

FIG. 8 is a cross-sectional view illustrating an optical module lens cap according to a third embodiment of the present invention.

Figure 9:
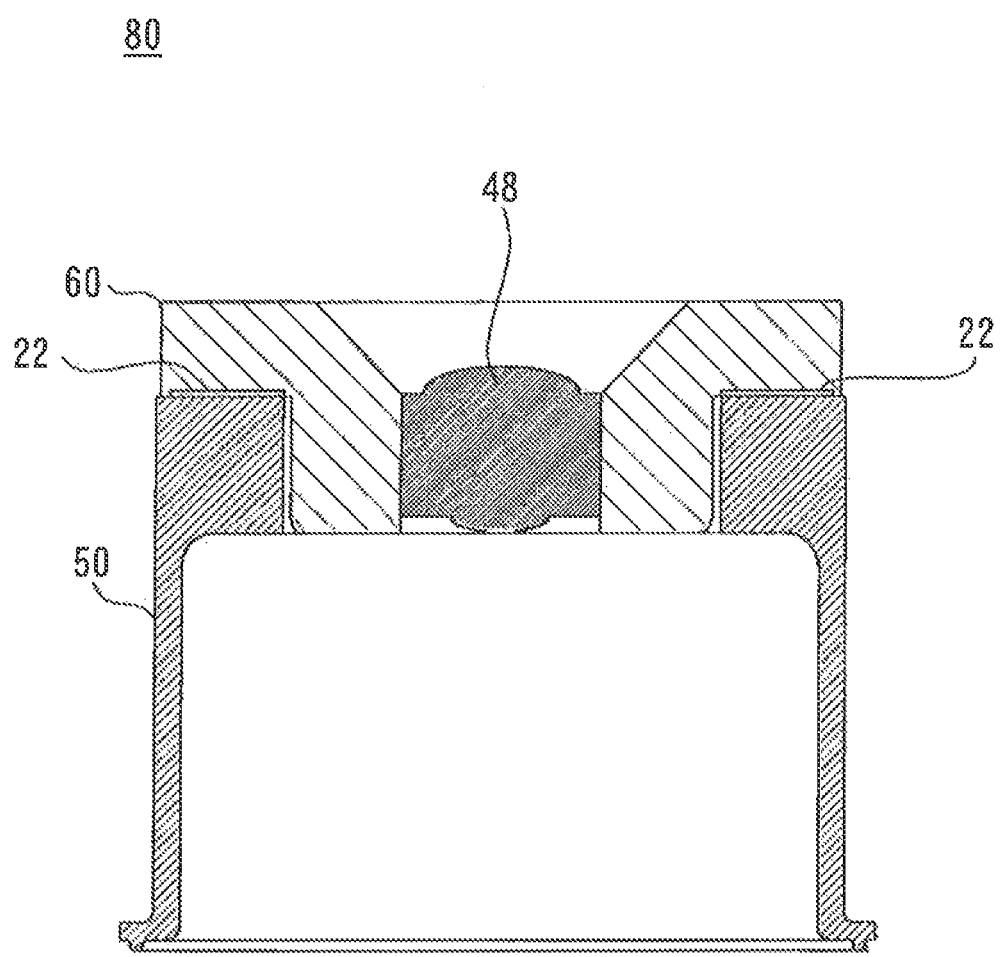

FIG. 9 is a cross-sectional view illustrating an optical module lens cap according to a third embodiment of the present invention.

Figure 10:
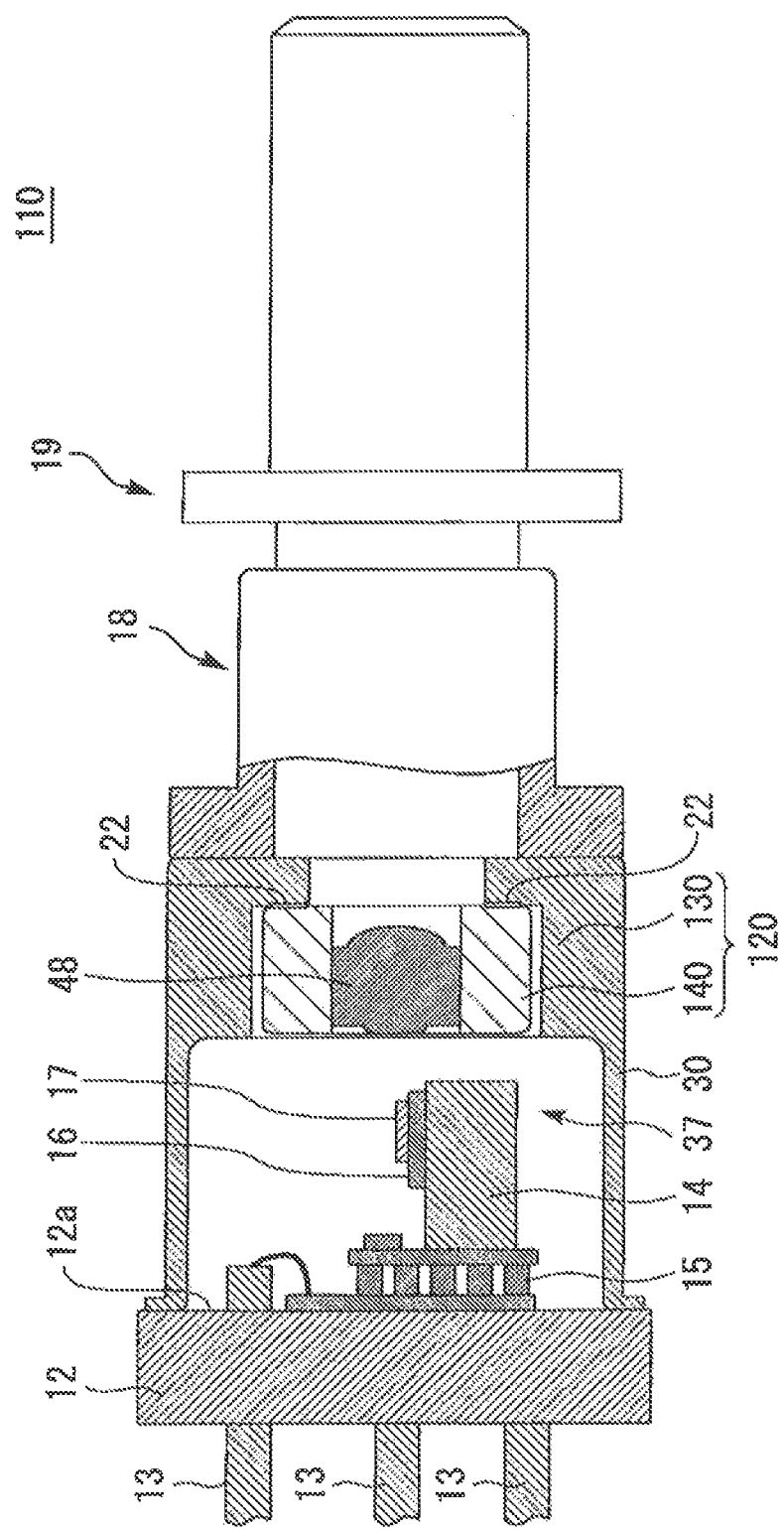

FIG. 10 is a cross-sectional view illustrating an optical module according to a fourth embodiment of the present invention.

Figure 11:
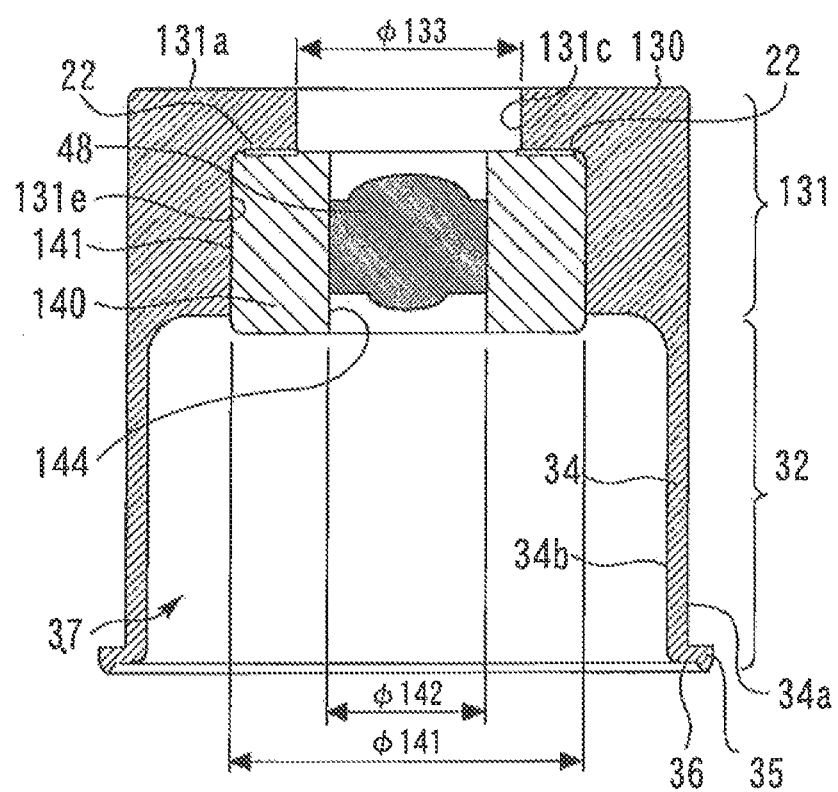

FIG. 11 is a cross-sectional view illustrating the optical module lens cap according to the fourth embodiment of the present invention.

FIG. 12 is a cross-sectional view illustrating the optical module lens cap according to the fourth embodiment of the present invention.

Figure 13:
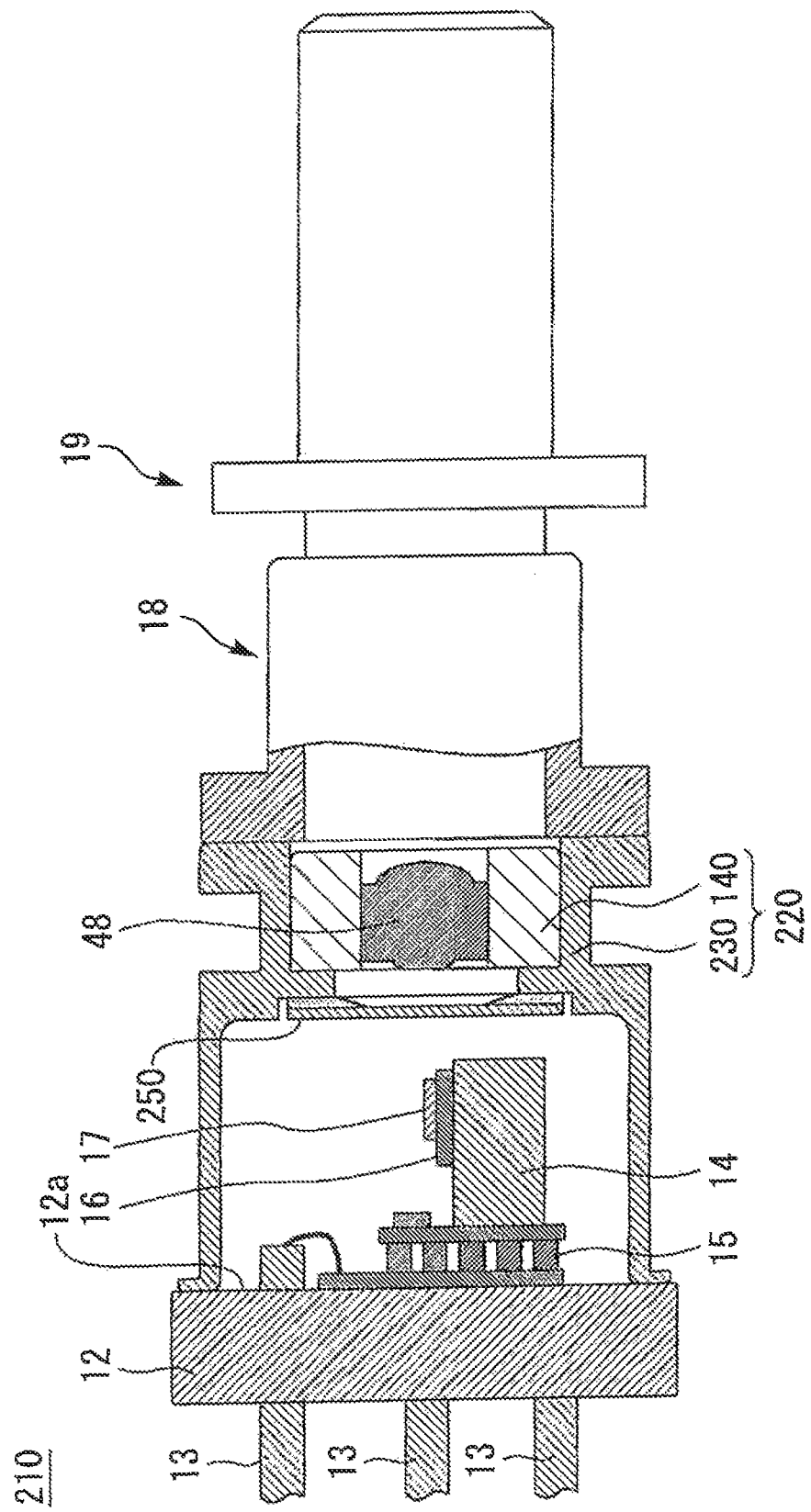

FIG. 13 is a cross-sectional view illustrating an optical module according to a fifth embodiment of the present invention.

FIG. 14 is a cross-sectional view of the optical module lens cap according to the fifth embodiment of the present invention.

Figure 15:
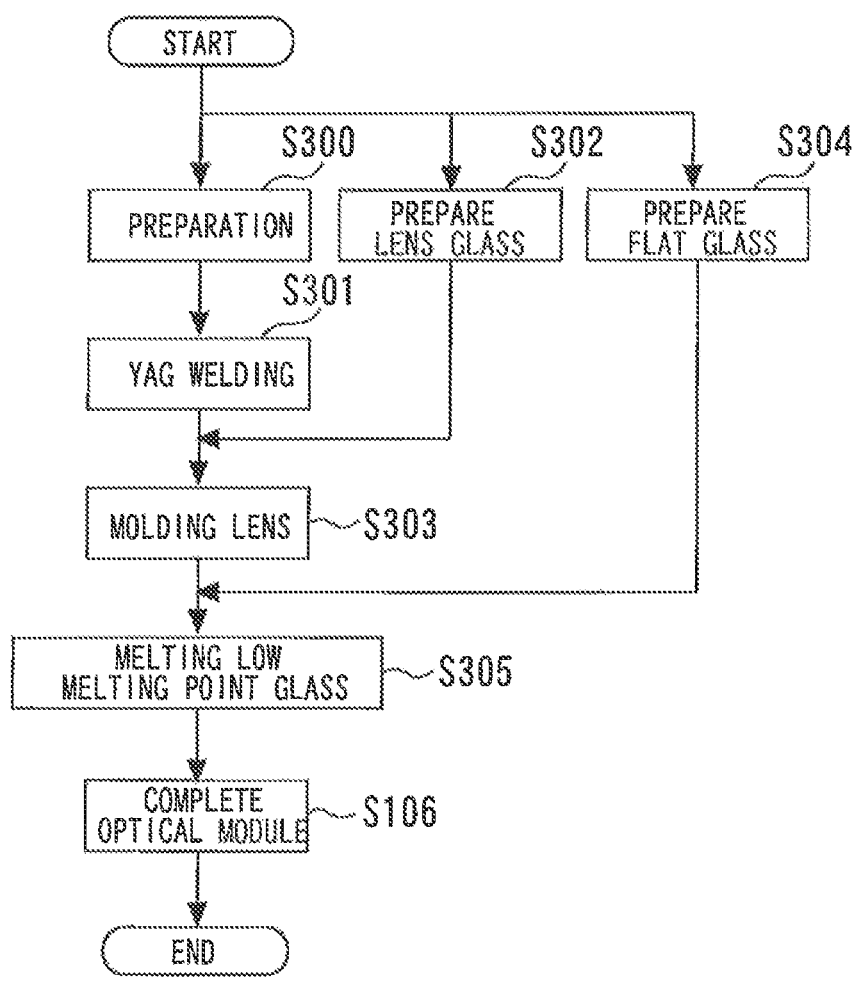

FIG. 15 is a flowchart illustrating a method for manufacturing the optical module according to the fifth embodiment of the present invention.

FIGS. 16A, 16B, 16C, 16D, 16E, and 16F are time sequence diagrams illustrating manufacturing processes of the optical module according to the fifth embodiment of the present invention.

Figure 17:
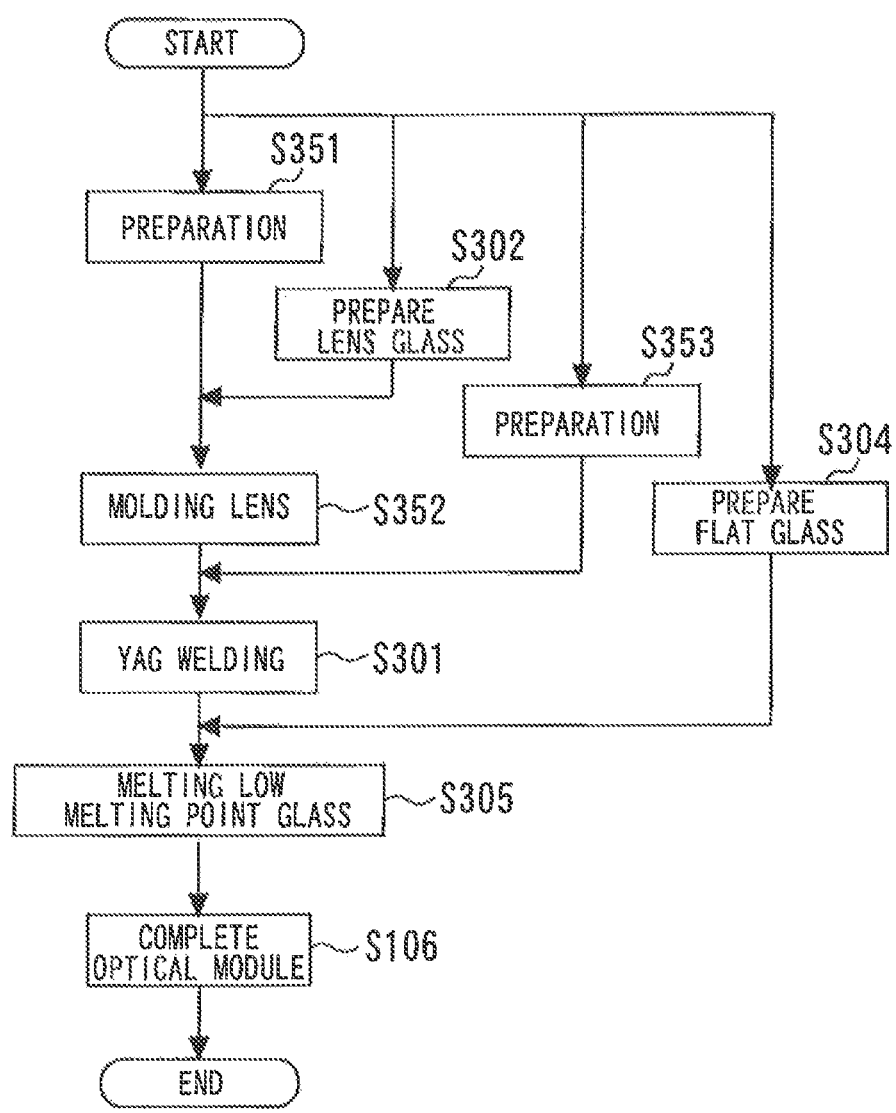

FIG. 17 is a flowchart illustrating a method for manufacturing the optical module according to the sixth embodiment of the present invention.

FIGS. 18A, 18B, 18C, and 18D are time sequence diagrams illustrating manufacturing processes of the optical module according to the sixth embodiment of the present invention.

Figure 19:
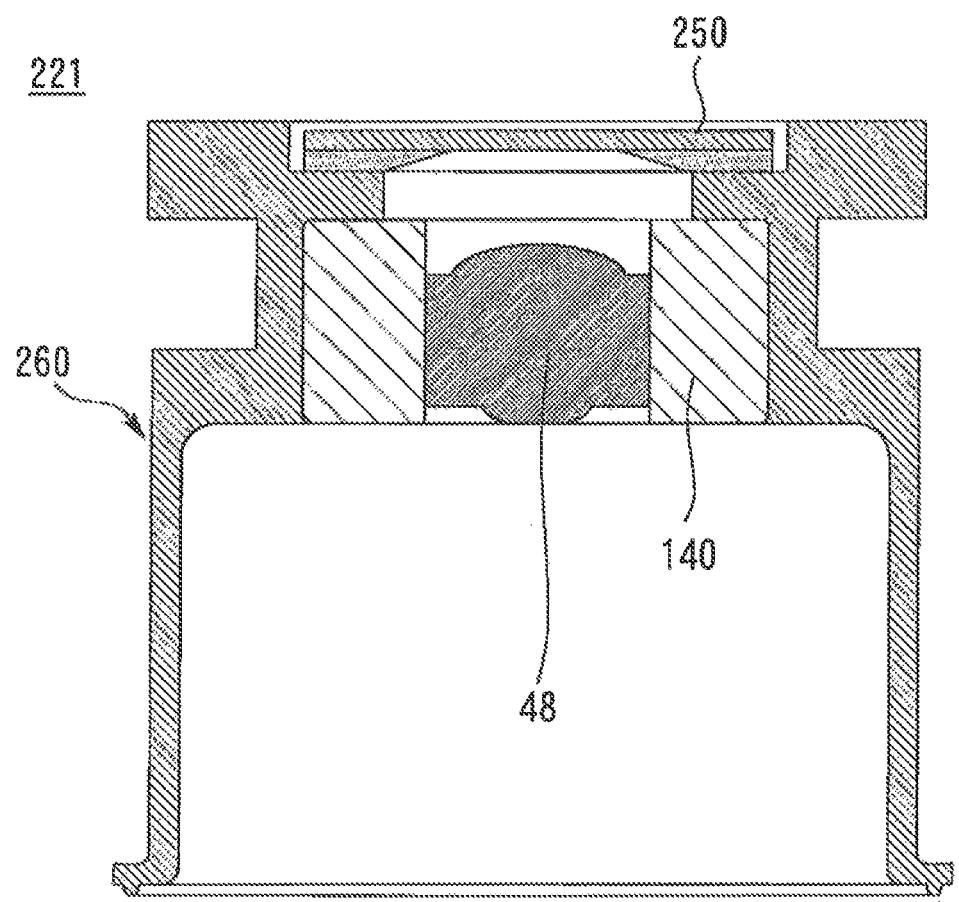

FIG. 19 is a cross-sectional view of the optical module lens cap according to the seventh embodiment.

Figure 20:
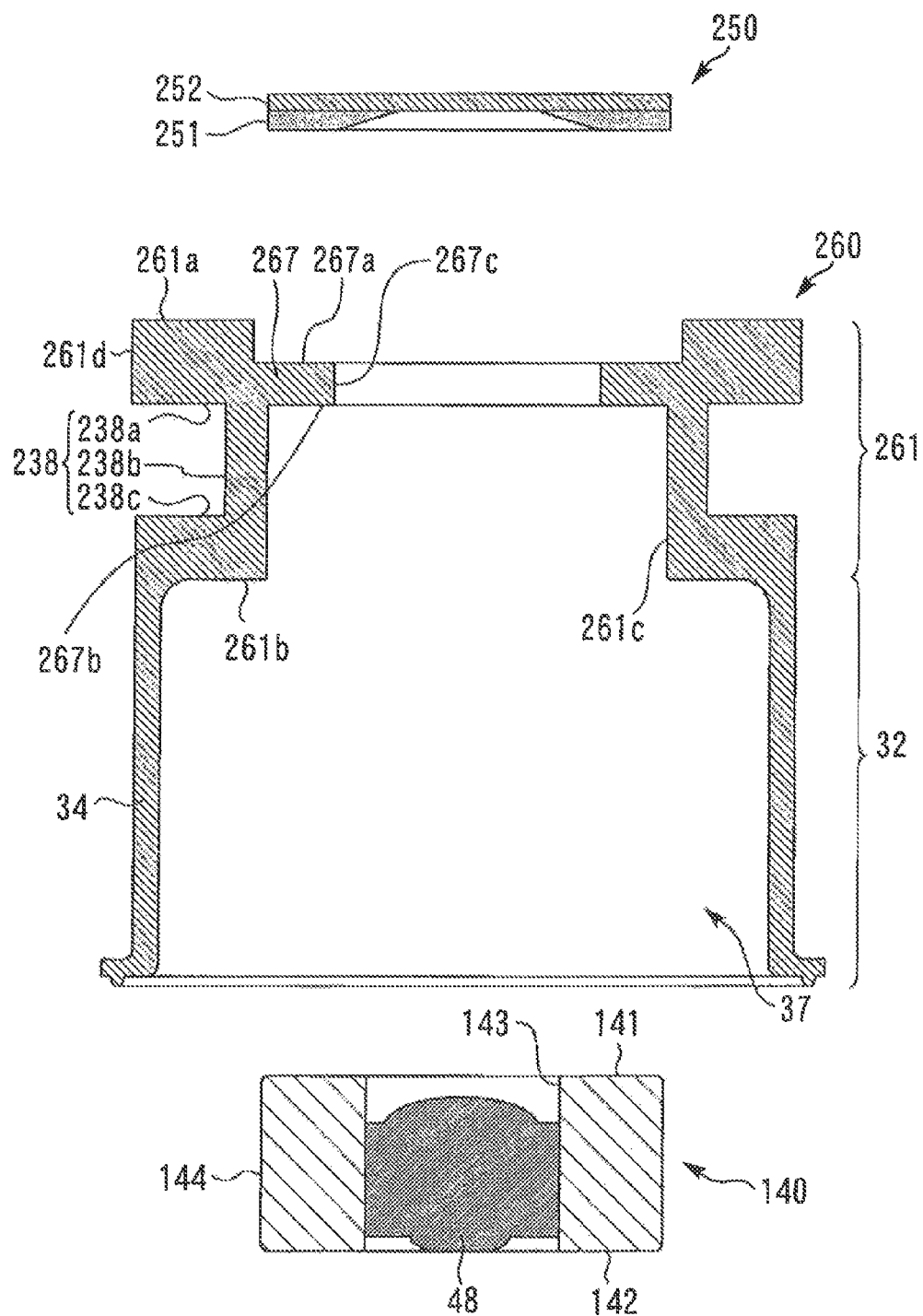

FIG. 20 is an exploded cross-sectional view illustrating the optical module lens cap according to the seventh embodiment of the present invention.

Figure 21A:
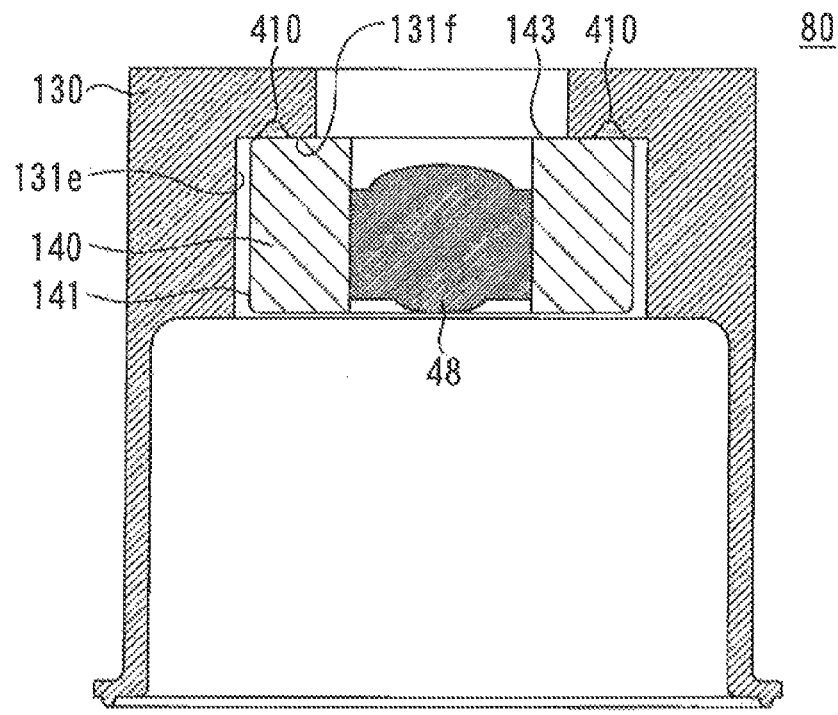
Figure 21B:
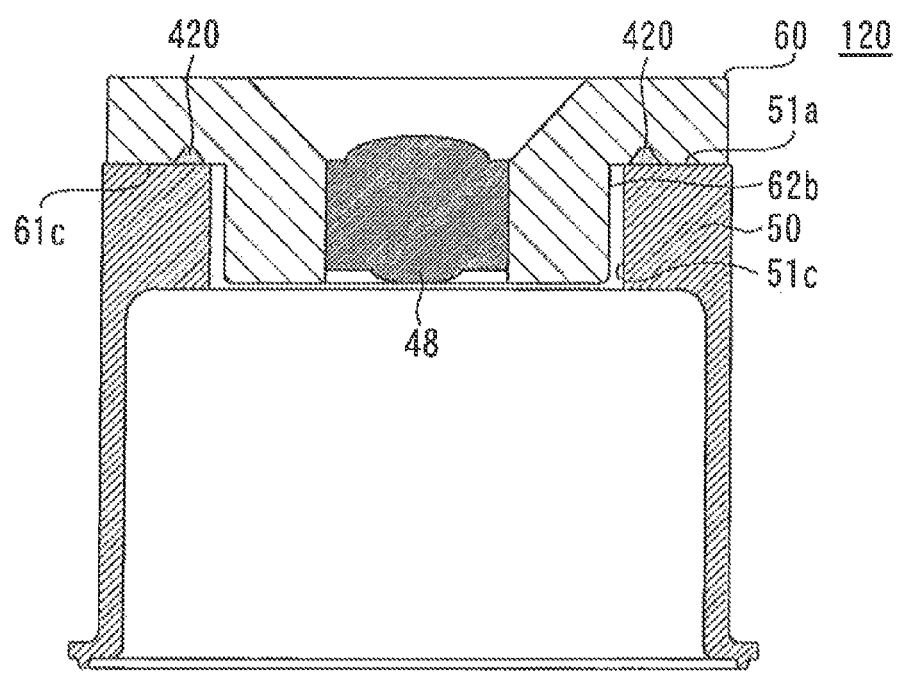

FIG. 21A and FIG. 21B are cross-sectional views illustrating optical module lens caps manufactured using the manufacturing method according to the eighth embodiment of the present invention.

Figure 22:
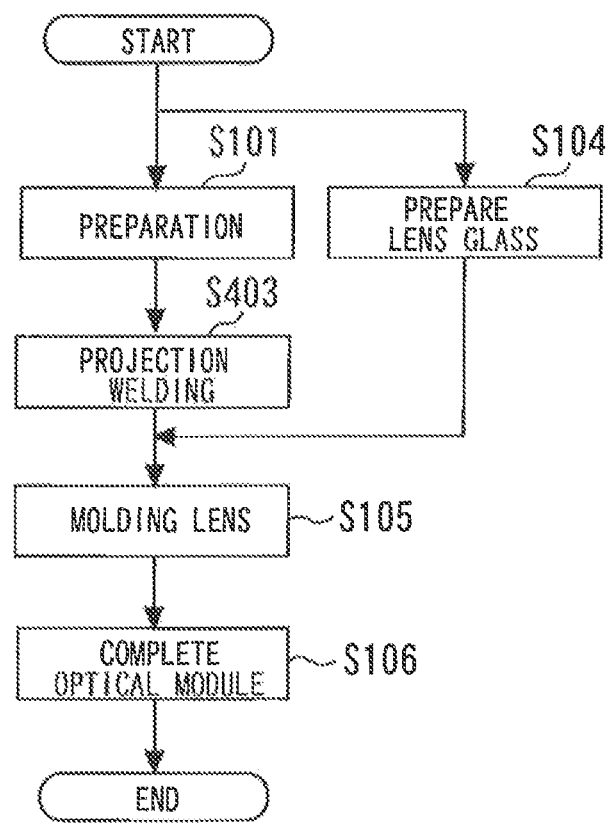

FIG. 22 is a flowchart illustrating a method for manufacturing an optical module according to the eighth embodiment of the present invention.

Figure 23:
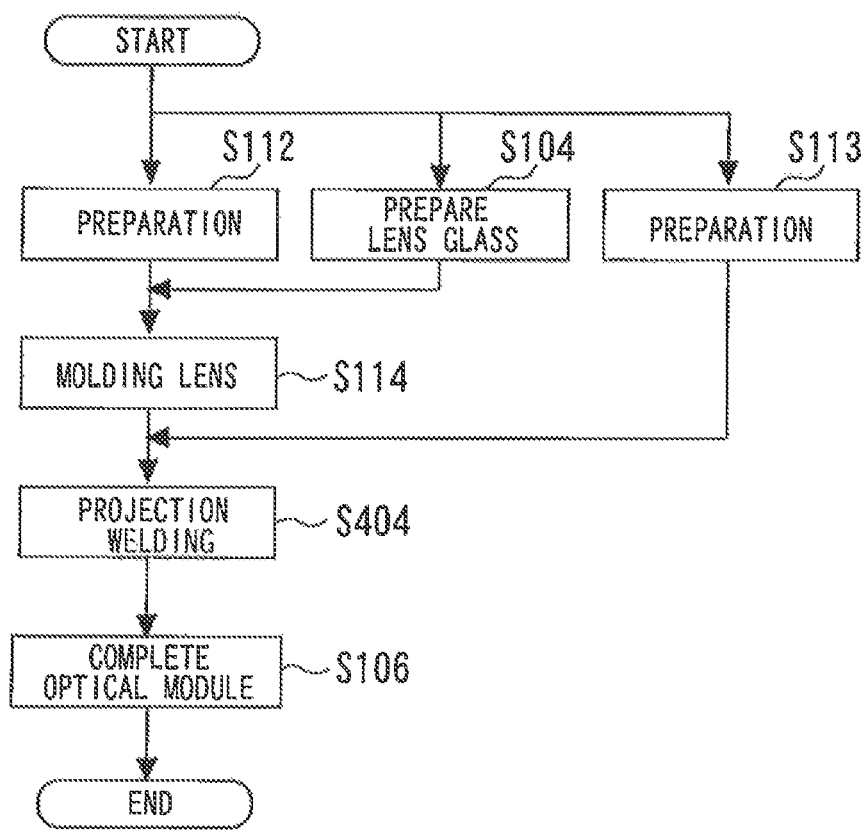

FIG. 23 is a flowchart illustrating a method for manufacturing an optical module according to a ninth embodiment of the present invention.

Figure 24:
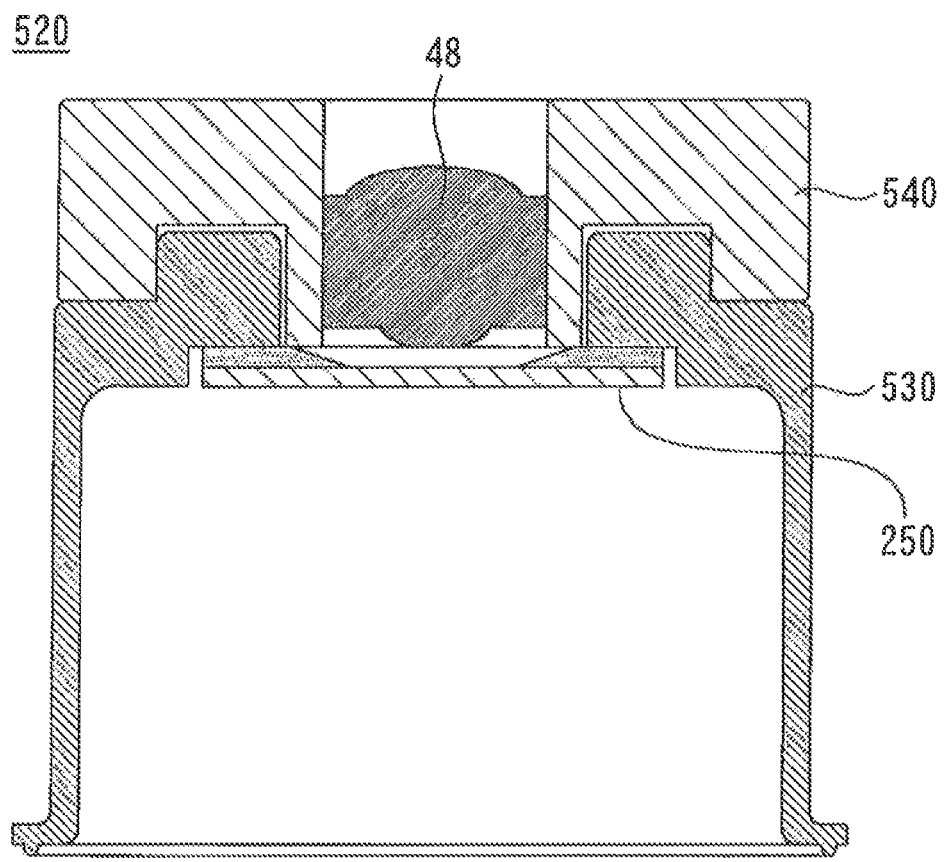

FIG. 24 is a cross-sectional view illustrating an optical module lens cap according to a tenth embodiment of the present invention.

Figure 25:
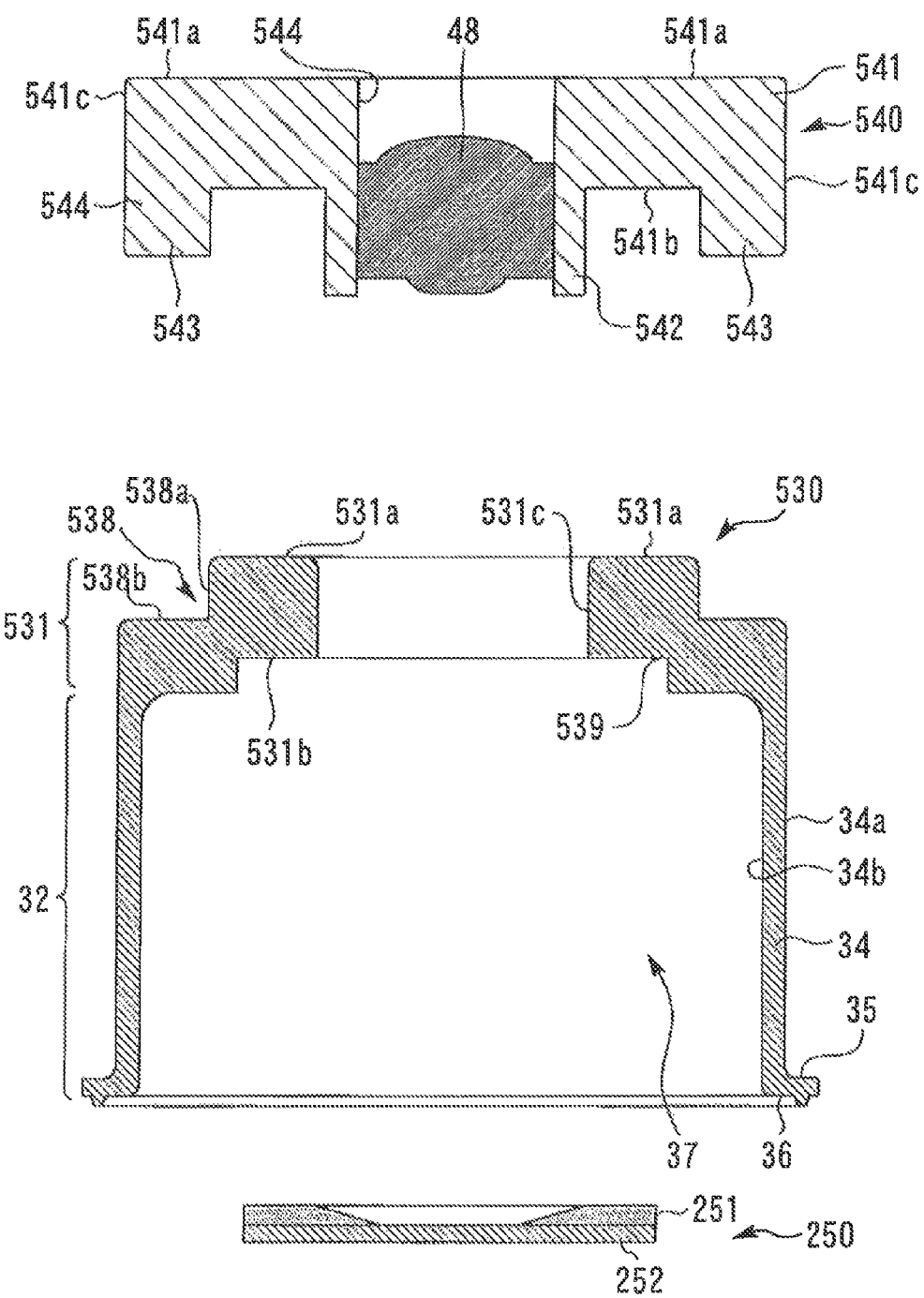

FIG. 25 is a cross-sectional view illustrating an optical module lens cap according to a tenth embodiment of the present invention.

Figure 26:
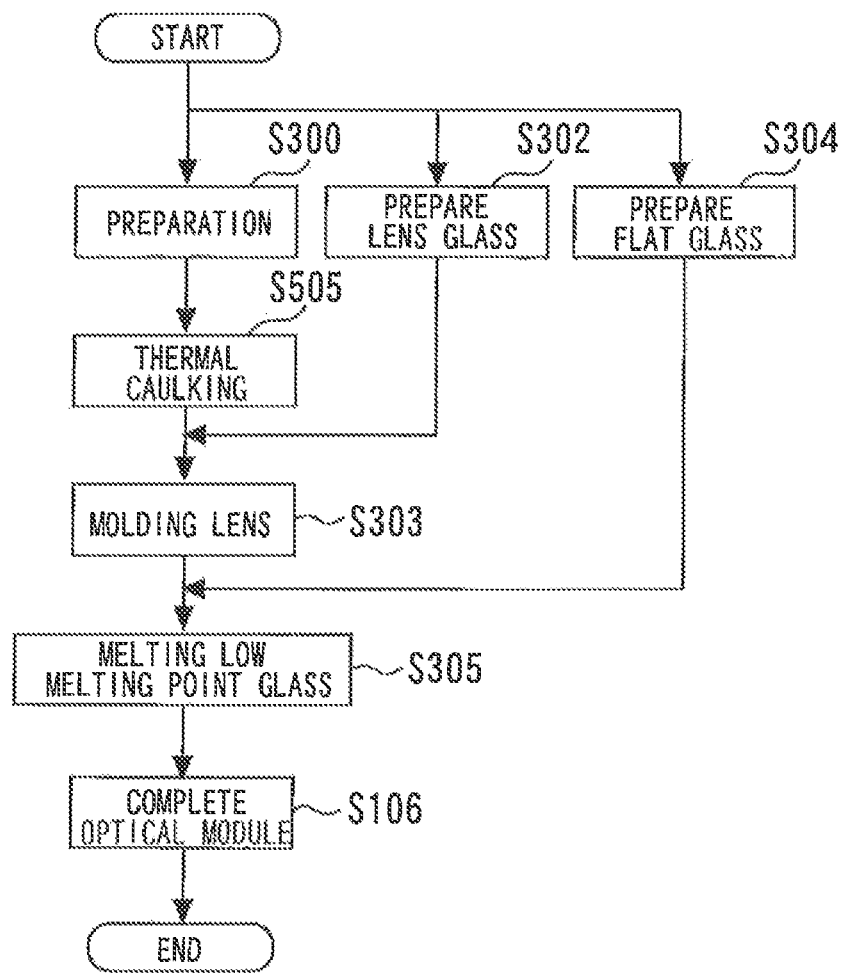

FIG. 26 is a flowchart illustrating a method for manufacturing the optical module according to the tenth embodiment of the present invention.

Figure 27:
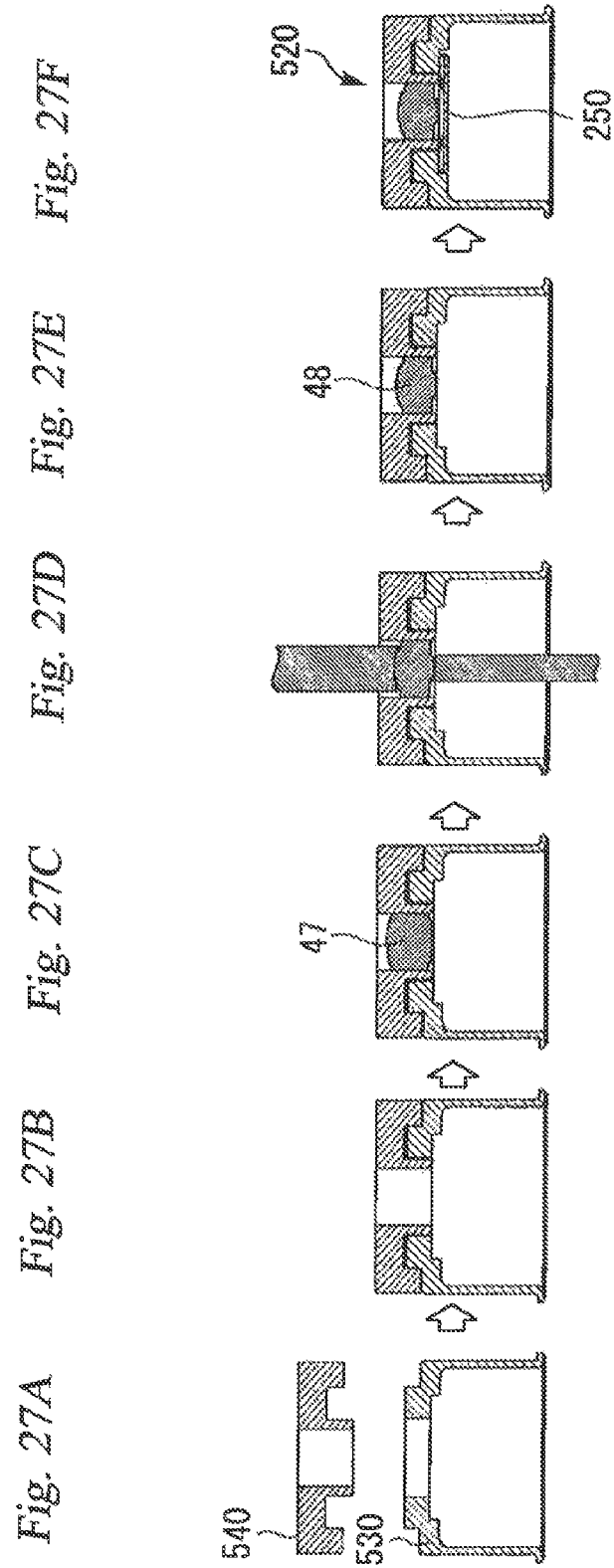
Figure 28:
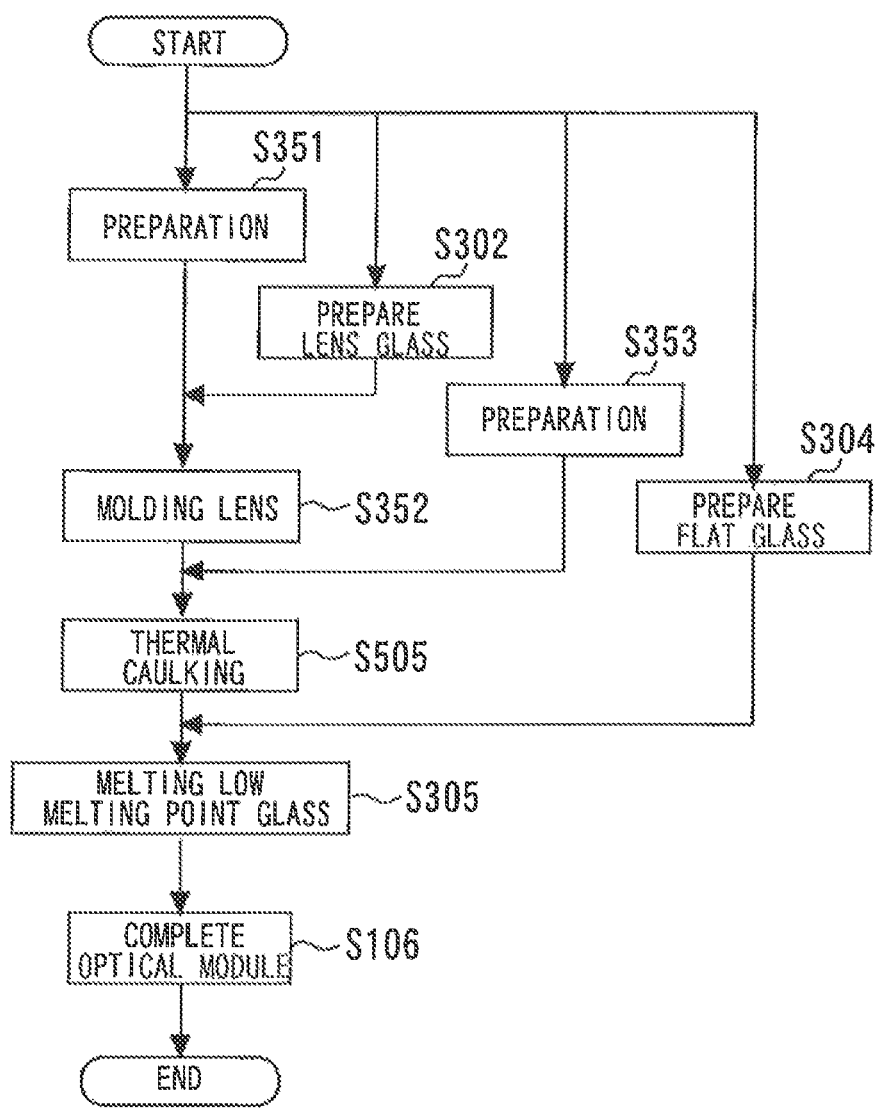

FIGS. 27A, 27B, 27C, 27D, 27E, and 27F are time sequence diagrams illustrating manufacturing processes of the optical module according to the tenth embodiment of the present invention FIG. 28 is a flowchart illustrating a method for manufacturing the optical module according to the eleventh embodiment of the present invention.

FIGS. 29A, 29B, 29C, and 29D are time sequence diagrams illustrating manufacturing processes of the optical module according to the eleventh embodiment of the present invention.

Figure 30:
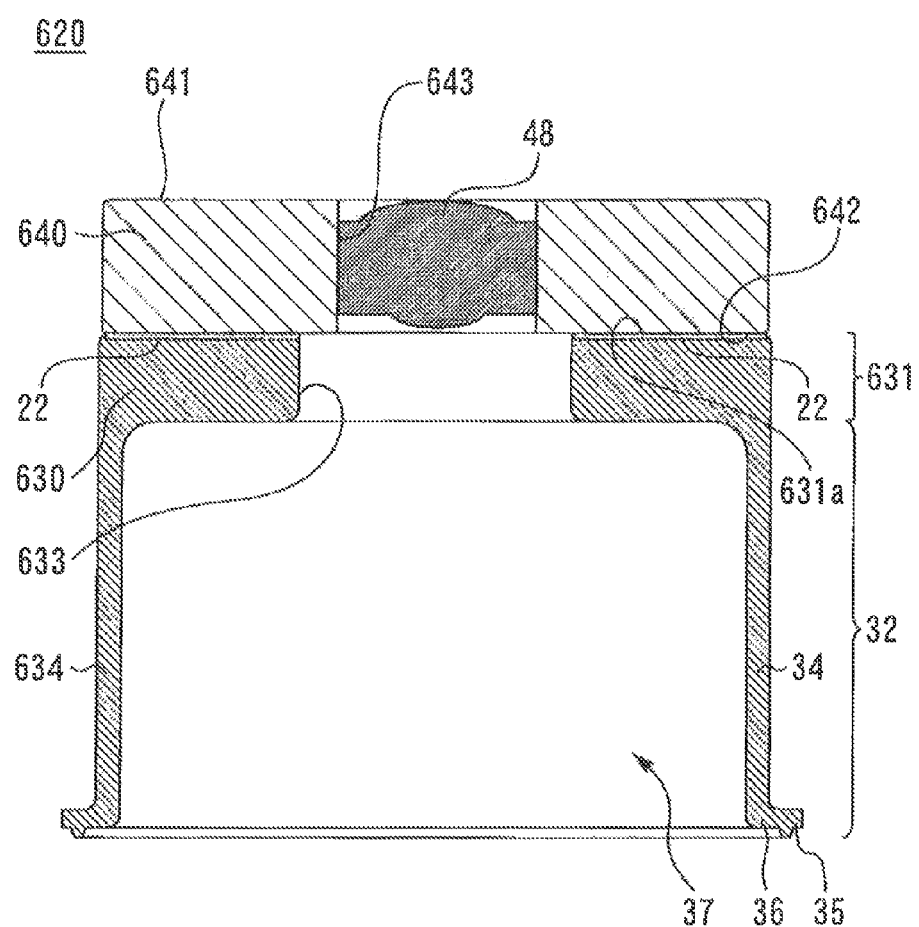

FIG. 30 is a cross-sectional view illustrating an optical module lens cap according to a twelfth embodiment of the present invention.

DETAILED DESCRIPTION OF THE PREFERRED EMBODIMENTS

First Embodiment

[Configuration of apparatus of first embodiment]

Figure 1:
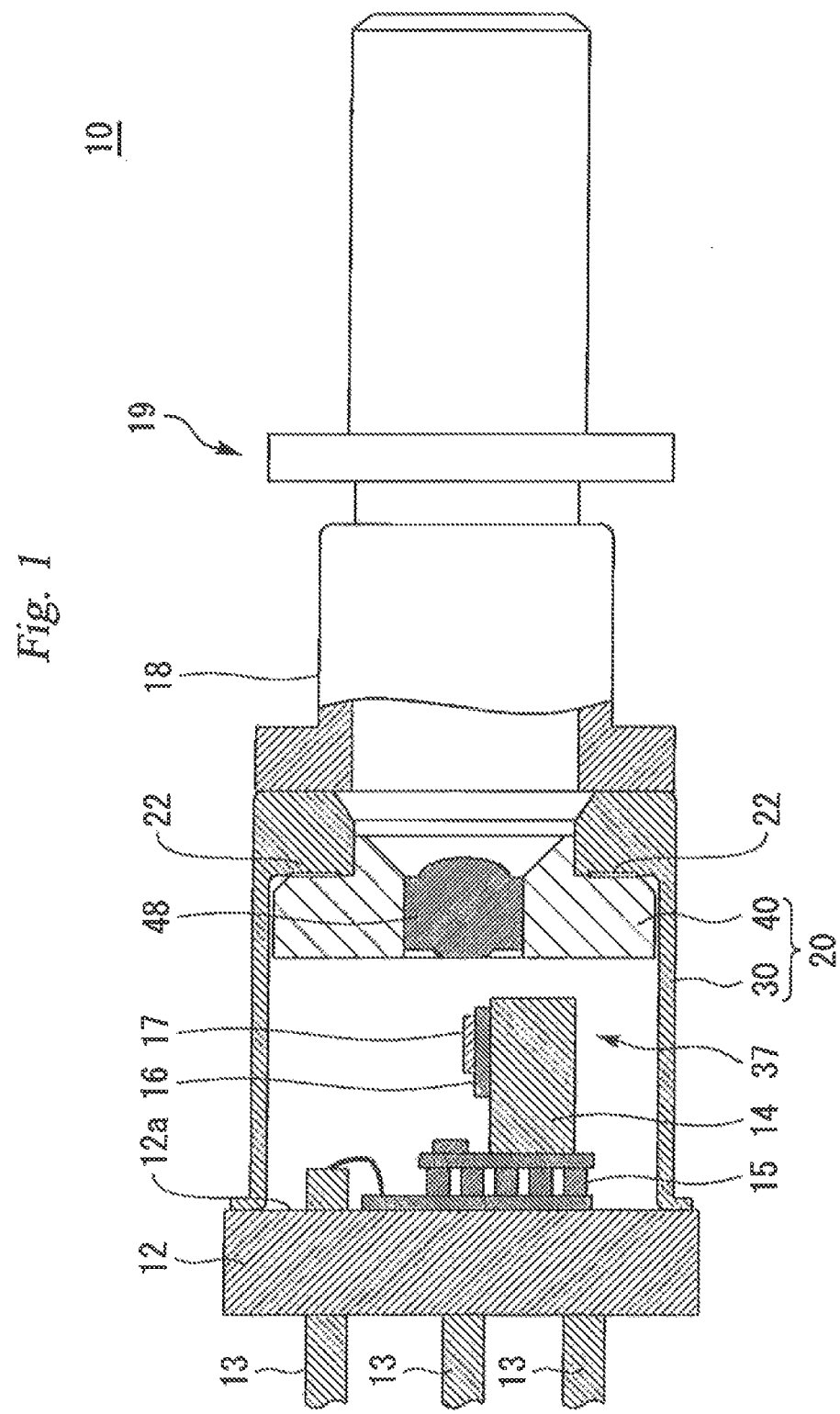
FIG. 1 is a cross-sectional view illustrating an optical module according to a first embodiment of the present invention.

FIG. 1 is a cross-sectional view illustrating an optical module 10 according to a first embodiment of the present invention. The optical module 10 is provided with a stem 12, an optical module lens cap 20 that covers the stem 12, a receptacle holder 18 fixed to the lens cap 20 and a receptacle 19. Hereinafter, the optical module lens cap will also be simply referred to as a "lens cap" for convenience of description.

The lens cap 20 is made up of a lens holder 40 fitted into a barrel 30. A lens 48 is fixed at a center of the lens holder 40. The barrel 30 as a whole is a hollow cylinder. Below the lens holder 40, a cavity 37 is formed of an inner surface of the barrel 30 and a top surface 12a of the stem 12.

A Peltier module 15 is provided on the top surface 12a of the stem 12. A metal block 14 is provided on the Peltier module 15. A submount 16 is provided on one side of the metal block 14 and a laser diode 17 which is an optical element is mounted on this submount 16. Though not shown in FIG. 1, electrodes of the laser diode 17 are connected to lead pins 13 via metal wires as appropriate.

Figure 2:
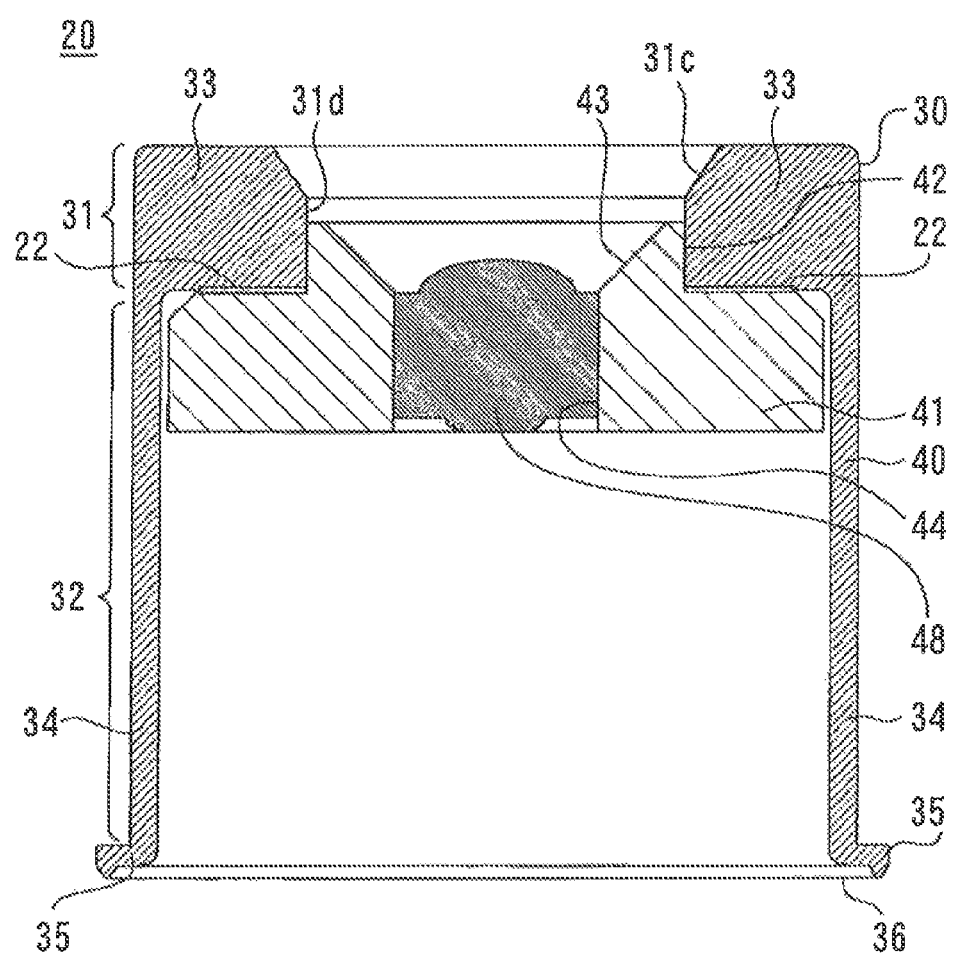
FIG. 2 is a cross-sectional view illustrating the optical module lens cap according to the first embodiment of the present invention.

FIG. 2 and FIG. 3 are cross-sectional views illustrating the optical module lens cap 20 according to the first embodiment of the present invention. FIG. 2 is a final drawing of the lens cap 20 and FIG. 3 is an exploded view of the lens cap 20.

As shown in FIG. 2, the lens cap 20 is made up of the barrel 30 and the lens holder 40 assembled together. The barrel 30 and the lens holder 40 are brazed together via a brazing layer 22. The barrel 30 is provided with a cover portion 31 and a cylindrical portion 32.

The cover portion 31 is provided at one end of the cylindrical portion 32. The cover portion 31 is provided with a thick-walled portion 33 and through holes 31c and 31d provided at a center of the thick-walled portion 33. The cover portion 31 is provided with mutually opposed surfaces: a top surface 31a and an undersurface 31b, and the undersurface 31b faces an inside of the cylindrical portion 32. The through hole 31d is a circular hole having a certain diameter and the through hole 31c is a hole provided so as to gradually increase in diameter from one end of the through hole 31d toward the top surface 31a of the cover portion 31.

The barrel 30 is a metallic barrel made of an alloy of iron, nickel and cobalt, or more specifically Kovar. The material of the barrel 30 is preferably a material having a smaller linear expansion coefficient than that of the material of the lens holder 40 which will be described later, more specifically a material having a linear expansion coefficient of $8 \times 10^{-6}$ [1/K] or below, and 42Ni—Fe or the like can also be used.

The cylindrical portion 32 is a cylinder whose interior forms the cavity 37. A side wall 34 of the cylindrical portion 32 is thin and whose interior forms the cavity 37. The side wall 34 is provided with an outer surface 34a and an inner surface 34b. The other end of the cylindrical portion 32 is left open and a collar portion 35 is provided at the other end. A bottom surface 36 of the collar portion 35 is fixed to the top surface 12a of the stem 12 and hermetically sealed.

The lens holder 40 is a ring-shaped member provided with a lens mounting hole 44. The lens holder 40 is metallic and more specifically formed of SUS430. The material of the lens holder 40 is preferably a material having a greater linear expansion coefficient than that of the material of the barrel 30, and more specifically preferably a material having a linear expansion coefficient of $10 \times 10^{-6}$ [1/K] or above, and ferrite-based stainless steel, or more specifically SF-20T (SHIMOMURA TOKUSHU SEIKO Co., Ltd.) or the like may also be used.

The lens mounting hole 44 is a circular hole having a certain diameter. An opening 43 which is provided so as to gradually increase in diameter toward the outside is connected at a distal end of the lens mounting hole 44.

The lens mounting hole 44 is provided with the lens 48. The lens 48 is provided by press-molding lens glass into the lens mounting hole 44. A linear expansion coefficient of the press lens glass used here is on the order of $6 \times 10^{-6}$ [1/K] to $8 \times 10^{-6}$ [1/K] and a material is selected which has a smaller linear expansion coefficient than that of the material of the lens holder 40.

In the cooling process after lens molding at 600° C. to 800° C., due to the difference in thermal expansion coefficients of the lens glass and the lens holder 40, the lens holder 40 tightens the lens 48, and it is thereby possible to improve air tightness between the lens 48 and the lens holder 40.

The lens holder 40 is provided with a columnar body portion 41 whose shape in a plan view is a circle of diameter φ41 and which has a certain thickness. The body portion 41 is provided with a top surface 41a, an undersurface 41b and a side face 41c that connects these surfaces. A convex portion 42 protrudes from the top surface 41a of the body portion 41. The convex portion 42 is provided along a rim of the lens mounting hole 44 of diameter φ42 and has a diameter of φ43. The convex portion 42 protrudes parallel to a direction in which the lens mounting hole 44 extends and is provided with a top surface 42a and a side face 42b.

The barrel 30 is a column having an outer diameter of φ31. The cylindrical portion 32 has an inner diameter of φ32, the through hole 31d has a diameter of φ34 and the through hole 31d has a maximum diameter of φ33.

The convex portion 42 is fitted into the through hole 31d, and the barrel 30 and the lens holder 40 are thereby assembled together. When the convex portion 42 is fitted into the through hole 31d, the undersurface 31b of the cover portion 31 comes into contact with the top surface 41a of the body portion 41 of the lens holder 40. The brazing layer 22 is provided when the undersurface 31b and the top surface 41a are brazed to each other. More specifically, brazing connection is performed by inserting a brazing material between the undersurface 31b and the top surface 41a and heating the brazed part, and the brazing layer 22 is thereby formed. The brazing material is provided with a through hole having a diameter smaller than the diameter φ41 and equal to or greater than the diameter φ43 at the center.

The convex portion 42 forms a level difference between the brazed region between the cover portion 31 and the lens holder 40, and the rim of the lens mounting hole 44 (the rim of the opening 43 to be more exact), the level difference constituting a convex portion on the side of this rim. The presence of this level difference prevents the melted brazing material from flowing toward the lens mounting hole 44 and the lens 48.

A plating layer is provided on the surface of the lens cap 20. The plating layer is provided on the barrel 30 and the lens holder 40 so as to cover the brazing layer 22.

In the lens cap 20, the lens holder 40 having a greater linear expansion coefficient is attached to inside the barrel 30. For this reason, in a high-temperature atmosphere, the lens holder 40 thermally expands (contracts) more than the barrel 30, the lens holder 40 contacts the inner surface of the barrel 30, thus adjusting the positional relation between the parts and preventing displacement of the lens 48.

[Manufacturing method of first embodiment]

Figure 4:
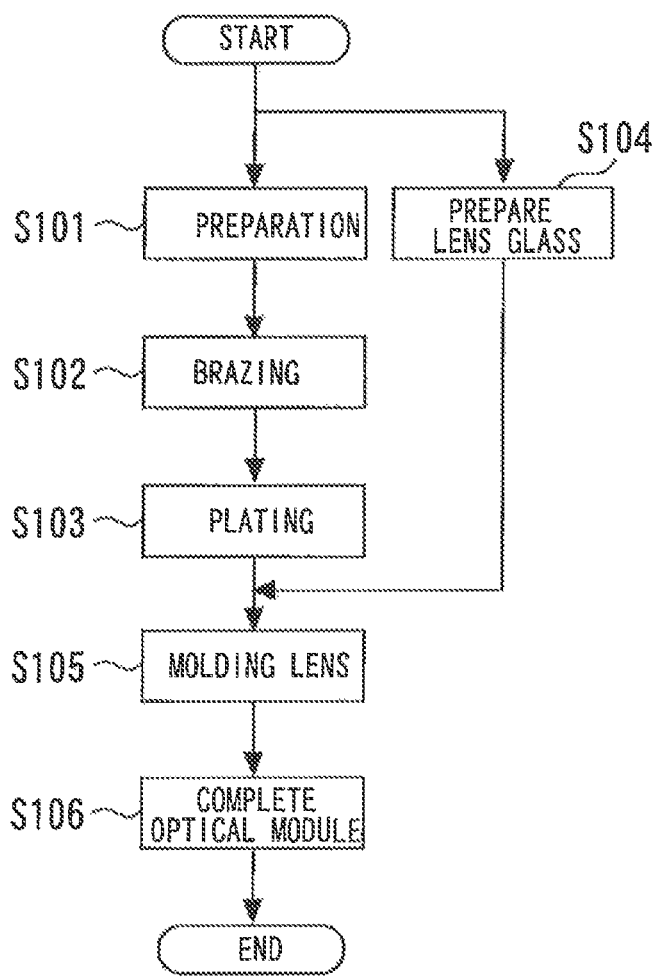
FIG. 4 is a flowchart illustrating a method for manufacturing an optical module according to the first embodiment of the present invention.

FIG. 4 is a flowchart illustrating a method for manufacturing an optical module according to the first embodiment of the present invention. FIGS. 5A to 5E are time sequence diagrams illustrating manufacturing processes of the optical module according to the first embodiment of the present invention.

(Step S101)

Figure 5:
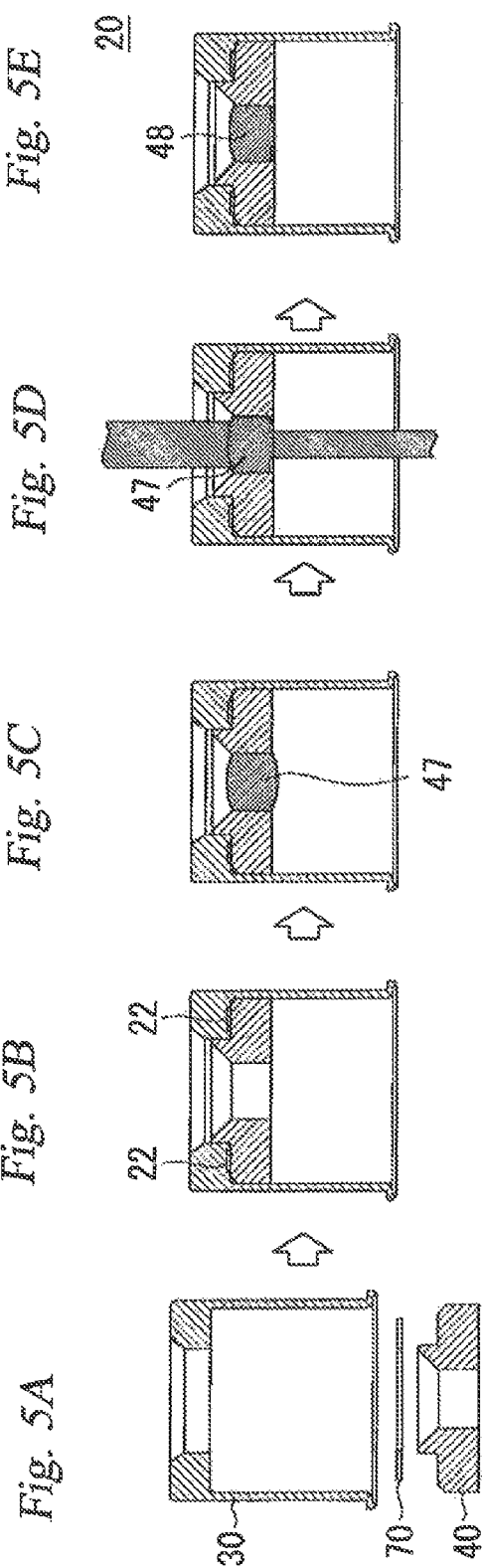

As shown in the flowchart of FIG. 4, a part preparation step is performed first. The part preparation step is a step of preparing the barrel 30 and the lens holder 40, fitting the lens holder 40 from the collar portion 35 side of the barrel 30 into the cylindrical portion 32 and assembling the barrel 30 and the lens holder 40 together. In this case, as shown in FIG. 5A, the barrel 30 and the lens holder 40 are assembled together so that the centers of the through holes 31c and 31d, and the lens mounting hole 44 are aligned with each other while sandwiching the brazing material 70 between the barrel 30 and the lens holder 40. The brazing material 70 is, for example, silver braze.

A clearance between the through hole 31d of diameter ϕ34 and the convex portion 42 of diameter ϕ42 is preferably determined as follows. That is, it is preferable to set a minimum value of diameter ϕ34 of the through hole 31d to be greater by approximately 5 μm than a maximum value of diameter ϕ42 of the convex portion 42 at a normal temperature so that this clearance becomes a minimum at a melting temperature of the brazing material 70.

(Step S102)

Brazing is performed by heating the assembled barrel 30 and lens holder 40, and melting the brazing material 70. The barrel 30 and the lens holder 40 are thereby united together and the lens cap 20 before mounting the lens 48 is completed as shown in FIG. 5B. At the temperature at which the brazing material 70 melts, the lens holder 40 expands more than the barrel 30. In this case, the clearance between the barrel 30 and lens holder 40 which are fitted with each other becomes narrower, producing an effect of correcting the positional relation between these parts.

(Step S103)

Plating (Ni, Au or the like) is applied to the lens cap 20 after the brazing. Plating may be applied after molding the lens (that is, after step S105 which will be described later).

(Step S104)

Next, as shown in FIG. 5C, the lens glass 47 is mounted in the lens mounting hole 44.

(Step S105)

Next, as shown in FIG. 5D, the lens glass 47 is sandwiched between metal dies and the lens 48 is press-molded using a pressing apparatus. In this case, positioning of press molding is performed using the barrel 30 as a reference.

After performing lens molding at a high temperature of 600° C. to 800° C., the lens is cooled. The lens 48 is thereby mounted in the lens holder 40 and the lens cap 20 is completed as shown in FIG. 5E. The lens 48 is fixed through thermal caulking due to a difference in the amount of thermal contraction between the materials of the lens glass 47 and the lens holder 40. Since a material having a larger linear expansion coefficient is used for the lens holder 40, it is possible to achieve a thermal caulking effect after molding the lens glass 47.

(Step S106)

After that, the lens cap 20 manufactured in the steps so far is placed and fixed on top of the stem 12 on which the laser diode 17 or the like has already been mounted. Moreover, by attaching the receptacle holder 18 and the receptacle 19, the optical module 10 is completed.

As described above, according to the first embodiment, after assembling the barrel 30 and the lens holder 40 of different linear expansion coefficients, it is possible to press-mold the lens glass into the lens holder 40 having a high thermal expansion coefficient while positioning the press molding using the barrel 30 having a smaller linear expansion coefficient as a reference.

Of the barrel 30 and the lens holder 40, positioning of press molding is performed using the barrel 30 for which a lower linear expansion coefficient is set as a reference, and it is thereby possible to reduce a positional variation of the lens 48. Using a material of a lower linear expansion coefficient for the barrel 30, it is also possible to prevent heat deformation. It is also possible to secure high air tightness between the lens 48 and the lens holder 40 through a tightening force generated from a thermal caulking effect due to a difference in thermal expansion coefficients between the lens glass and the lens holder 40. As a result, it is possible to reduce a positional variation of the lens 48 while securing high air tightness.

Furthermore, by fitting the lens holder 40 into the barrel 30, assembling together and utilizing a difference between their linear expansion coefficients, there is also an effect of narrowing a clearance between these parts and correcting the positional relation between these parts.

Furthermore, when the brazing layer 22 is exposed to outside air, the brazing material may be discolored in a high-temperature and high-humidity environment. Moreover, in a cap air tightness test using He (helium), He may be adsorbed onto the surface of the brazing layer 22, having an effect on the determination of air tightness. In this respect, by covering the brazing material with the plating layer as in the case of the first embodiment, it is possible to prevent the problem with discoloration of the brazing material and adsorption of He.

Second Embodiment

A lens cap and an optical module provided therewith according to a second embodiment are provided with parts having shapes and materials similar to those of the lens cap 20 and the optical module 10 according to the first embodiment. The difference between the second embodiment and the first embodiment lies in the manufacturing method of the lens cap 20.

FIG. 6 is a flowchart illustrating a method for manufacturing the optical module according to the second embodiment of the present invention. FIGS. 7A to 7D are time sequence diagrams illustrating manufacturing processes of the optical module according to the second embodiment of the present invention.

In the first embodiment, lens molding is performed after the assembly and brazing of the barrel 30 and the lens holder 40. In contrast, in the second embodiment, the lens is molded into the lens holder 40 first and then the lens holder 40 provided with the lens 48 is brazed to the barrel 30.

Figure 7:
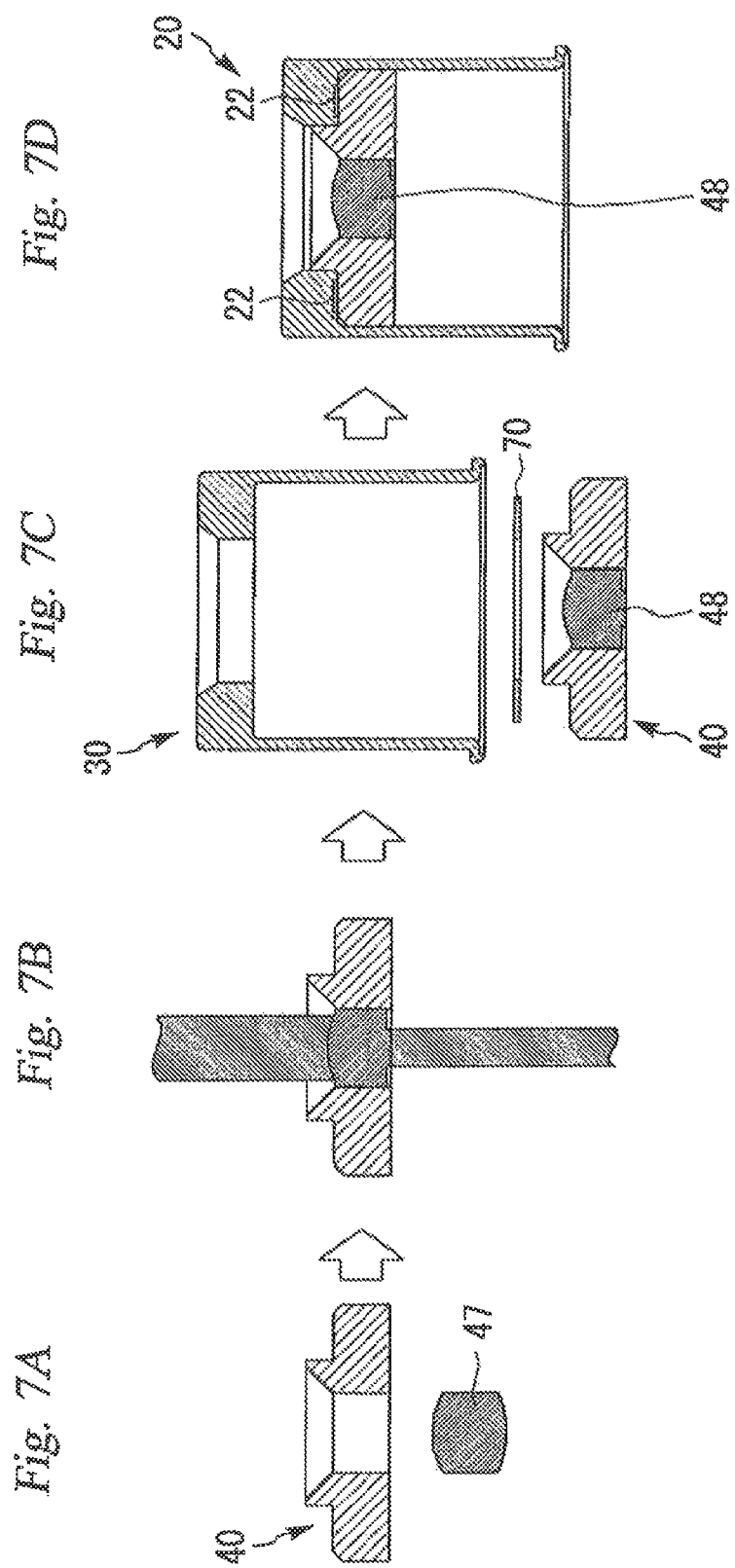

As shown in FIG. 7A, the lens holder 40 which is a part is prepared (step S112) and the lens glass is prepared (step S104) as in the case of the first embodiment. Next, as shown in FIG. 7B, the lens 48 is formed through press molding (step S114). Thus, the second embodiment differs from the first embodiment in that the lens 48 is press-molded before assembling the lens holder 40 and the barrel 30.

Next, the barrel 30 which is another part is prepared separately (step S113), and the barrel 30 and the lens holder 40 are assembled with the brazing material 70 sandwiched therebetween as shown in FIG. 7C. After that, brazing is performed in the same way as in the first embodiment (step S102), and a plating step is performed on the surface of the completed lens cap 20 after the brazing (step S103). After these steps are done, the lens cap 20 is completed as shown in FIG. 7D.

After that, like step S106 of the first embodiment, the barrel and the lens holder are assembled with the stem 12 on which the laser diode 17 or the like has already been mounted, the receptacle holder 18 and the receptacle 19, and the optical module is completed.

By fitting the lens holder 40 having a larger linear expansion coefficient into the barrel 30 having a smaller linear expansion coefficient and heating these parts, the second embodiment can also improve positioning accuracy between these parts and improve positioning accuracy of the lens 48.

Third Embodiment

[Configuration of apparatus of third embodiment]

FIG. 8 and FIG. 9 are cross-sectional views illustrating an optical module lens cap 80 according to a third embodiment of the present invention. The optical module according to the third embodiment is provided with parts having shapes and materials similar to those of the optical module 10 according to the first embodiment except in that the lens cap 20 is replaced by the lens cap 80. Therefore, components identical or equivalent to those in the first embodiment will be described, assigned the same reference numerals, and description will be focused on differences from the first embodiment and description of common items will be simplified or omitted.

FIG. 9 is a cross-sectional view of the lens cap 80 and FIG. 8 is an exploded cross-sectional view of the lens cap 80. As shown in FIG. 9, the lens cap 80 is provided with a barrel 50 and a lens holder 60. The material of the barrel 50 is the same as the material of the barrel 30, and the material of the lens holder 60 is the same as the material of the lens holder 40.

Like the barrel 30 of the first embodiment, the barrel 50 is provided with the cylindrical portion 32, provided with a cover portion 51 at one end of the cylindrical portion 32, and the other end of the cylindrical portion 32 is left open. The cover portion 51 is provided with a top surface 51a, an undersurface 51b, and a through hole 51c of diameter $\phi 54$ that penetrates these portions.

As shown in FIG. 8, the lens holder 60 is provided with a body portion 61 provided with a top surface 61a and an undersurface 61b and a convex portion 62 that protrudes in a columnar form from the undersurface 61b. The convex portion 62 is provided with an undersurface 62a and a side face 62b.

A lens mounting hole 64 is provided at a center of the lens holder 60 and an opening 63 is provided whose diameter gradually increases from one end of the lens mounting hole 64 toward the top surface 61a of the body portion 61. The convex portion 62 extends along a rim of the lens mounting hole 64. The lens mounting hole 64 has a diameter of $\phi 63$ and the convex portion 62 has a diameter of $\phi 62$, a size larger than the diameter $\phi 63$.

As shown in FIG. 8, the convex portion 62 is fitted into the through hole 51c, the undersurface 61b of the lens holder 60 comes into contract with the top surface 51a of the barrel 50, these surfaces are brazed to each other, and the lens holder 60 and the barrel 50 are thereby united into the lens cap 80. The brazing layer 22 is provided between the undersurface 61b of the lens holder 60 and the top surface 51a of the barrel 50. The side face 62b of the convex portion 62 adjoins to the wall of the through hole 51c with a predetermined clearance.

By fitting the lens holder 40 having a larger linear expansion coefficient into the barrel 30 having a smaller linear expansion coefficient, the third embodiment can also improve positioning accuracy between these parts and improve positioning accuracy of the lens 48.

The side face 62b of the convex portion 62 can hold back leakage of the brazing layer 22.

[Method for manufacturing apparatus of third embodiment]

The manufacturing method according to the aforementioned first embodiment may be adopted as a method for manufacturing the optical module provided with the lens cap 80 according to the third embodiment. That is, the lens holder 60 and the barrel 50 are assembled and brazed together with the brazing material 70 inserted therebetween beforehand. After that, the lens may be molded into the lens holder 60 by pressing the lens with a pressing apparatus using the barrel 50 as a reference for positioning.

Alternatively, the lens cap 80 and the optical module provided therewith may be manufactured using the manufacturing method according to the aforementioned second embodiment. That is, the lens is molded into the lens holder 60 beforehand by pressing the lens with a pressing apparatus. After that, the lens holder 60 and the barrel 50 after the molding of the lens 48 may be assembled and brazed together with the brazing material 70 inserted therebetween.

Note that as described in the first embodiment, a plating step may be performed after brazing and the brazing layer 22 may be covered with a plating layer.

Fourth Embodiment

[Configuration of apparatus of fourth embodiment]

FIG. 10 is a cross-sectional view illustrating an optical module 110 according to a fourth embodiment of the present invention. The optical module 110 according to the fourth embodiment is provided with the same components as those of the optical module 10 according to the first embodiment except the lens cap 20 which is replaced by a lens cap 120. Therefore, components identical or equivalent to those in the first embodiment will be described, assigned the same reference numerals, and description will be focused on differences from the first embodiment and description of common items will be simplified or omitted.

FIG. 11 and FIG. 12 are cross-sectional views illustrating the optical module lens cap 120 according to the fourth embodiment of the present invention. FIG. 11 is a cross-sectional view of the lens cap 120 and FIG. 12 is an exploded cross-sectional view of the lens cap 120. The lens cap 120 is provided with a barrel 130 and a lens holder 140. The material of the barrel 130 is the same as that of the barrel 30 according to the first embodiment and the material of the lens holder 140 is the same as that of the lens holder 40 according to the first embodiment.

The lens holder 140 as a whole is a ring-shaped member having a columnar shape of diameter $\phi 141$ and provided with a lens mounting hole 144 of diameter $\phi 142$ at the center thereof. The lens holder 140 is provided with mutually opposed top surface 141 and undersurface 142, and a side face 143 connecting these surfaces. The lens holder 140 is not provided with any convex portion corresponding to the convex portion 42 of the lens holder 40.

Like the barrel 30 of the first embodiment, the barrel 130 is provided with the cylindrical portion 32 and provided with a cover portion 131 at one end of the cylindrical portion 32 and the other end of the cylindrical portion 32 is left open. The cover portion 131 is provided with a top surface 131a, an undersurface 131b, and a through hole 131c of diameter $\phi 133$ that penetrates these surfaces.

A concave portion 131d is provided on the undersurface 131b side of the cover portion 131. The concave portion 131d is a columnar dent made up of an undersurface 131f and a side face 131e, and has a diameter corresponding to the diameter φ141 of the lens holder 140 plus a predetermined clearance.

The lens holder 140 is fitted in the concave portion 131d. The depth of the concave portion 131d substantially coincides with the height of the lens holder 140. However, the present invention is not limited to this and the depth of the concave portion 131d may be greater or conversely smaller than the height of the lens holder 140. This is because at least part of the lens holder 140 needs to be fitted into the concave portion 131d.

By fitting the lens holder 140 having a larger linear expansion coefficient into the barrel 130 having a smaller linear expansion coefficient, the fourth embodiment can also improve positioning accuracy between these parts and improve positioning accuracy of the lens 48.

[Method for manufacturing apparatus of fourth embodiment]

The aforementioned manufacturing method of the first embodiment may be adopted as a method for manufacturing the lens cap 120 and the optical module provided therewith according to the fourth embodiment. That is, the lens holder 140 and the barrel 130 are assembled and brazed together beforehand with the brazing material 70 inserted therebetween. After that, the lens may be molded into the lens holder 140 by pressing the lens with a pressing apparatus using the barrel 130 as a reference for positioning.

Alternatively, the lens cap 120 and the optical module provided therewith may also be manufactured using the manufacturing method according to the aforementioned second embodiment. That is, the lens is molded into the lens holder 140 by pressing the lens with a pressing apparatus. After that, the lens holder 140 and the barrel 130 after molding the lens 48 may be assembled and brazed together with the brazing material 70 inserted therebetween.

As described in the first embodiment, a plating step may be performed after brazing and the brazing layer 22 may be covered with a plating layer.

In the fourth embodiment, the concave portion 131d is provided on the undersurface 131b side of the cover portion 131, but the present invention is not limited to this. A concave portion having the same diameter as that of the concave portion 131d may be provided on the top surface 131a side of the cover portion 131 and the lens holder 140 may be fitted into this concave portion.

Fifth Embodiment

[Configuration of apparatus of fifth embodiment]

FIG. 13 is a cross-sectional view illustrating an optical module 210 according to a fifth embodiment of the present invention. The optical module 210 according to the fifth embodiment is provided with the same components as those of the optical module 10 according to the first embodiment except in that the lens cap 20 is replaced by a lens cap 220. Therefore, components identical or equivalent to those in the first embodiment will be described, assigned the same reference numerals, and description will be focused on differences from the first embodiment and description of common items will be simplified or omitted.

FIG. 14 is a cross-sectional view of the optical module lens cap 220 according to the fifth embodiment of the present invention. The lens cap 220 corresponds to a barrel 230 and the lens holder 140 according to the fourth embodiment assembled together and fixed through penetration laser welding. As described in the fourth embodiment, the material of the lens holder 140 is the same as that of the lens holder 40 and the material of the barrel 230 is the same as that of the barrel 30 according to the first embodiment.

Like the barrel 30 of the first embodiment, the barrel 230 is provided with the cylindrical portion 32, and provided with a cover portion 231 at one end of the cylindrical portion 32 and the other end of the cylindrical portion 32 is left open.

The cover portion 231 is provided with a top surface 231a, an undersurface 231b, and a through hole 231c of diameter φ233 that penetrates these surfaces. A base portion 237 is provided in the middle of the through hole 231c. The base portion 237 is a ring-shaped portion that protrudes inward from the wall of the through hole 231c. The base portion 237 is provided with a through hole 237c of diameter φ235 (φ233>φ235) at a center thereof. The lens holder 140 is fitted into a concave portion formed of a top surface 237a of the base portion 237 and a wall of the through hole 231c.

A flat glass 250 is attached to an undersurface 237b of the base portion 237. The flat glass 250 corresponds to ring-shaped low melting point glass 251 provided along a circumference of a glass body 252 on the surface of the glass body 252. Since it has a ring shape, no low melting point glass 251 is provided at a center of the glass body 252, allowing light to pass therethrough. The base portion 237 and the glass body 252 are connected via the low melting point glass 251, and it is thereby possible to secure air tightness.

The cover portion 231 is provided with a thin-walled portion 238 on the side face 231d. That is, the thin-walled portion 238 is a groove provided at a center of the side face 231d and this groove is a ring-shaped groove that extends around a perimeter of the side face 231d of the cover portion 231.

A cross-sectional shape of this thin-walled portion 238 is a groove made up of an inner side faces 238a and 238c, and an inner bottom surface 238b as shown in FIG. 14. The thickness between the inner bottom surface 238b and the wall of the through hole 231c is designed to be a thickness that allows the lens holder 140 to be welded to the wall of the through hole 231c through penetration laser welding.

The present invention is not limited to this. Unlike the ring-shaped groove as in the case of the thin-walled portion 238, the thin-walled portion may be provided only on part of the side face 231d. This is because, the thin-walled portion may be provided only in a region to which penetration laser welding should be applied.

[Method for manufacturing apparatus of fifth embodiment]

FIG. 15 is a flowchart illustrating a method for manufacturing the optical module according to the fifth embodiment of the present invention. FIGS. 16A to 16F are time sequence diagrams illustrating manufacturing processes of the optical module according to the fifth embodiment of the present invention.

Figure 16:
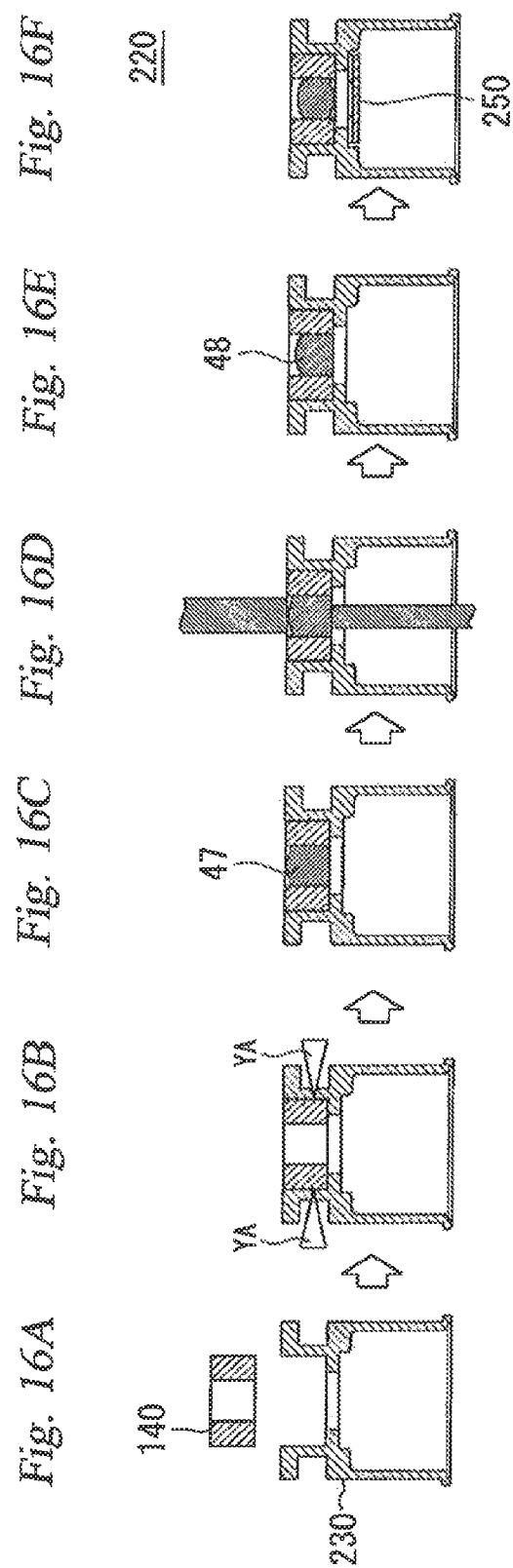

In the flowchart shown in FIG. 15, a part preparation step, that is, a step of preparing and assembling the barrel 230 and the lens holder 140 is performed first as shown in FIG. 16A (step S300). That is, the lens holder 140 is fitted into a concave portion formed of the wall and the base portion 237 of the through hole 231c of the barrel 230. At this point in time, the lens 48 is not provided in the lens holder 140.

Next, as shown in FIG. 16B, penetration laser welding is performed (step S301). The thin-walled portion 238 is irradiated with YAG laser light YA. Next, as shown in FIG. 16C, lens glass 47 is set in the lens mounting hole 144 (step S302). Next, as shown in FIG. 16D, lens molding is performed with the lens glass 47 sandwiched between metal dies using a pressing apparatus (step S303). As a result, the lens 48 is molded as shown in FIG. 16E.

Next, the flat glass 250 is prepared (step S304). The low melting point glass 251 is fixed to the undersurface 237b of the base portion 237 and melted (step S305). As a result, the lens cap 220 is completed as shown in FIG. 16F.

After that, as in the case of step S106 of the first embodiment, the barrel and the lens holder are assembled with the stem 12 on which the laser diode 17 or the like has already been mounted, the receptacle holder 18 and the receptacle 19, and the optical module is completed.

A plating step may be performed before or after lens molding.

Sixth Embodiment

A sixth embodiment manufactures the optical module 210 according to the fifth embodiment using a manufacturing method different from that of the fifth embodiment. In the fifth embodiment, the lens holder 140 and the barrel 230 are assembled and welded through penetration laser welding and the lens 48 is then press-molded. In contrast, in the sixth embodiment, the lens 48 is press-molded into the lens holder 140 first. After that, the lens holder 140 provided with the lens 48 is welded to the barrel 230 through penetration laser welding.

FIG. 17 is a flowchart illustrating a method for manufacturing the optical module according to the sixth embodiment of the present invention. FIGS. 18A to 18D are time sequence diagrams illustrating manufacturing processes of the optical module according to the sixth embodiment of the present invention.

In the flowchart of FIG. 17, the lens holder 140 as a part is prepared (step S351) and the lens glass 47 is set in the lens holder 140 (step S302). This results in a situation as shown in FIG. 18A.

Next, the lens glass 47 is sandwiched between metal dies and subjected to lens molding using a pressing apparatus (step S352).

Next, the barrel 230 which is another part is prepared (step S353), and the lens holder 140 is fitted into the barrel 230 and penetration laser welding is performed in the same way as step in S301 of the fifth embodiment. As shown in FIG. 18C, the thin-walled portion 238 is irradiated with YAG laser light YA and welding is performed.

Figure 18:
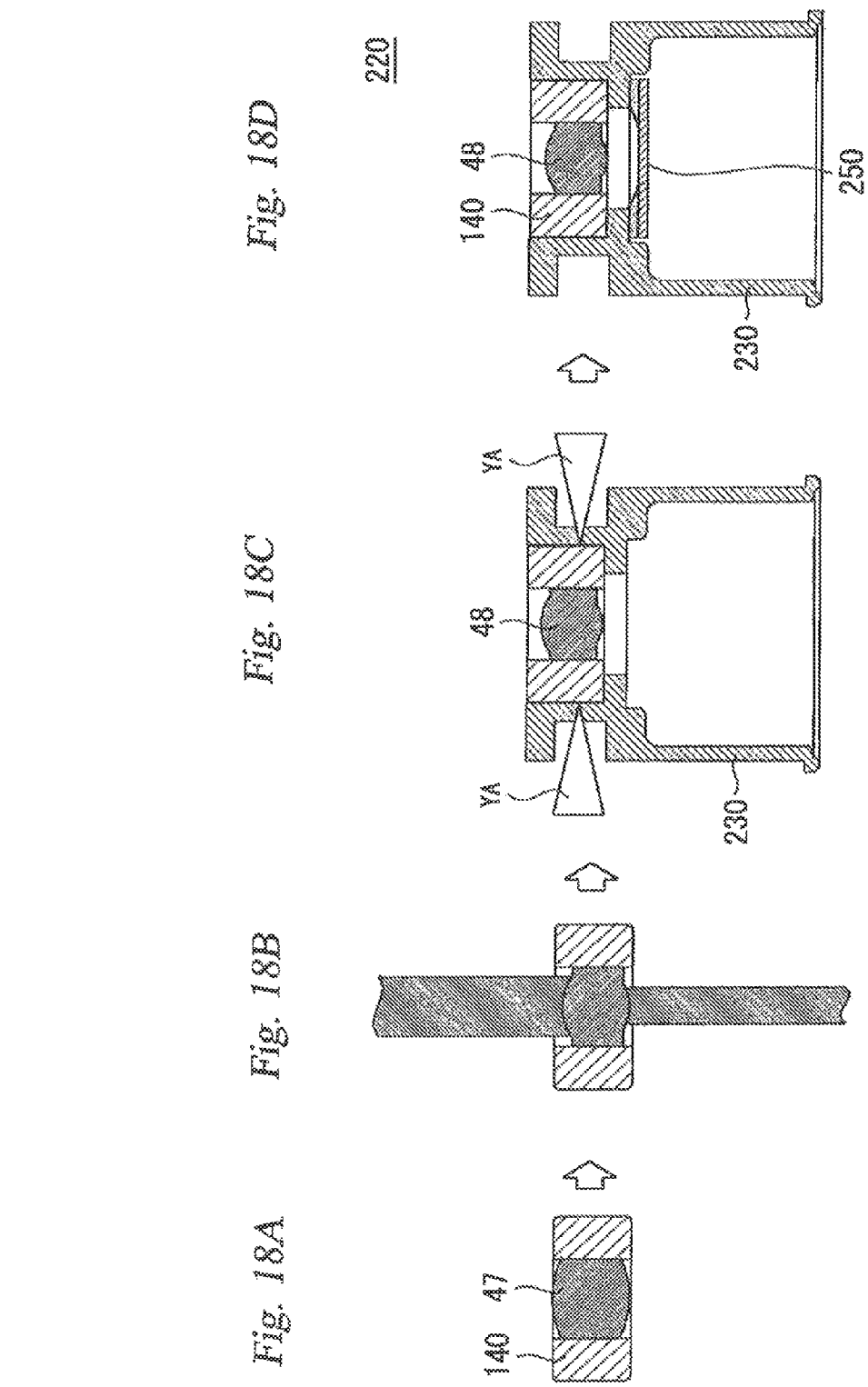

After that, the flat glass 250 is prepared like step S304 of the fifth embodiment, a step of melting the low melting point glass is performed like step S305 of the fifth embodiment and the lens cap 220 is completed as shown in FIG. 18D.

After that, like step S106 of the first embodiment, the barrel and the lens holder are assembled with the stem 12 on which the laser diode 17 or the like has already been mounted, the receptacle holder 18 and the receptacle 19, and the optical module is completed.

Seventh Embodiment

[Configuration of apparatus of seventh embodiment]

An optical module according to a seventh embodiment is provided with the same components as those in the optical module 10 according to the first embodiment except in that the lens cap 20 is replaced by a lens cap 221. Therefore, components identical or equivalent to those in the first embodiment will be described, assigned the same reference numerals, and description will be focused on differences from the first embodiment and description of common items will be simplified or omitted.

FIG. 19 is a cross-sectional view of the optical module lens cap 221 according to the seventh embodiment. FIG. 20 is an exploded cross-sectional view illustrating the optical module lens cap 221 according to the seventh embodiment of the present invention.

In FIG. 19, as is clear from a comparison with FIG. 14, the mounting positions of the lens holder 140 and the flat glass 250 are reversed between the lens cap 220 and the lens cap 221. That is, in the lens cap 221, the lens holder 140 is accommodated inside the cylindrical portion 32.

Like the lens cap 220, the lens cap 221 is provided with the lens holder 140 and the flat glass 250. However, the lens cap 221 is different from the lens cap 220 in that it is provided with a barrel 260 instead of the barrel 230.

The barrel 260 is similar to the barrel 230 in that it is provided with the cylindrical portion 32. However, the structure of a cover portion 261 is different from that of the cover portion 231. The cover portion 261 is provided with a top surface 261a, an undersurface 261b, a through hole 261c and a side face 261d. The through hole 261c is provided inside the cylindrical portion 32 of the cover portion 261. A base portion 267 similar to the base portion 237 of the sixth embodiment protrudes from the wall of this through hole 261c. A through hole 267c is formed in the base portion 267. The lens holder 140 is fitted into the concave portion made up of the undersurface 267b of the base portion 267 and the wall of the through hole 261c.

The flat glass 250 is fixed to a top surface 267a of the base portion 267 via the low melting point glass 251 thereof and air tightness is thereby secured.

A thin-walled portion 238 similar to the barrel 230 shown in the sixth embodiment is provided on the side face 261d of the barrel 260.

[Method for manufacturing apparatus of seventh embodiment]

The method for manufacturing the lens cap 221 and the optical module provided therewith according to the seventh embodiment may be the same as the manufacturing method according to the aforementioned fifth embodiment. That is, the lens holder 140 and the barrel 260 are welded through penetration laser welding and united together. After that, the lens holder 140 may be subjected to lens molding by pressing the lens with a pressing apparatus using the barrel 260 as a reference for positioning.

Alternatively, the lens cap 221 and the optical module provided therewith may also be manufactured according to a manufacturing method similar to that of the aforementioned sixth embodiment. That is, the lens holder 140 is subjected to lens molding by pressing the lens with a pressing apparatus beforehand. After that, the lens holder 140 after molding the lens 48 and the barrel 260 may be welded and united through penetration laser welding.

Eighth Embodiment

An eighth embodiment relates to a lens cap to which projection welding is applied, an optical module provided therewith and their respective manufacturing methods. The lens cap and optical module according to the eighth embodiment are provided with parts having shapes and materials similar to those in the aforementioned embodiments. However, the eighth embodiment is different from the aforementioned embodiments in that projection welding is used to assemble the lens cap.

FIG. 21A and FIG. 21B are cross-sectional views illustrating optical module lens caps 80 and 120 manufactured using the manufacturing method according to the eighth embodiment of the present invention. The lens cap 80 is brazed in the third embodiment and the lens cap 120 is brazed in the fourth embodiment. In contrast, projection welding is used instead of brazing as fixing means in the eighth embodiment. As shown in FIGS. 21A and 21B, projection welding portions 410 and 420 are provided instead of the brazing layer 22 respectively.

FIG. 22 is a flowchart illustrating a method for manufacturing an optical module according to the eighth embodiment of the present invention. The flowchart in FIG. 22 is the same as the flowchart in FIG. 4 according to the first embodiment except step S403.

Like step S101 in the first embodiment, the barrel 50 and the lens holder 60 are assembled and projection welding is then applied thereto (step S403). Fixing by welding can secure as high air tightness and connection reliability as that by brazing. Moreover, welding is free of problems with discoloration and adsorption of He which might occur when brazing is used, and therefore the bonded parts need not be covered with plating. Moreover, it is possible to weld the contacting part between the holder and the barrel by a single application of voltage, and therefore ring projection welding also has a feature of providing higher productivity than YAG welding.

After that, lens glass preparation in step S104 and lens molding in step S105 are performed as in the case of the first embodiment. Finally, like step S106 of the first embodiment, the barrel and the lens holder are assembled with the stem 12 on which the laser diode 17 or the like has already been mounted, the receptacle holder 18 and the receptacle 19, and the optical module is completed.

The aforementioned eighth embodiment has described the lens caps 80 and 120, but the present invention is not limited to this. In the lens caps 20, 220 and 221, projection welding may be used for connections between the respective lens holders and barrels.

Ninth Embodiment

FIG. 23 is a flowchart illustrating a method for manufacturing an optical module according to a ninth embodiment of the present invention. The flowchart in FIG. 23 is the same as the flowchart in FIG. 6 according to the second embodiment except in that step S102 is replaced by step S404 and step S103 is deleted.

The same steps as steps S104, S112 and S114 in the first embodiment are performed, and the lens 48 is thereby provided in the lens holder 60 beforehand. After that, the lens holder 60 provided with the lens 48 is projection-welded to the barrel 50 which is the part prepared in step S113 (step S404).

After that, like step S106 of the first embodiment, the barrel and the lens holder are assembled with the stem 12 on which the laser diode 17 or the like has already been mounted, the receptacle holder 18 and the receptacle 19, and the optical module is completed.

Tenth Embodiment

[Configuration of apparatus of tenth embodiment]

FIG. 24 is a cross-sectional view illustrating an optical module lens cap 520 according to a tenth embodiment of the present invention. The optical module according to the tenth embodiment is provided with the same components as those of the optical module 10 according to the first embodiment except in that the lens cap 20 is replaced by the lens cap 520. Therefore, components identical or equivalent to those in the first embodiment will be described, assigned the same reference numerals, and description will be focused on differences from the first embodiment and description of common items will be simplified or omitted.

FIG. 25 is an exploded view of the lens cap 520. The lens cap 520 is provided with a barrel 530, a lens holder 540 and a flat glass 250. The lens cap 520 is different from the aforementioned embodiments in that the barrel 530 and lens holder 540 are fixed through thermal caulking.

The barrel 530 is formed of the same material as that of the barrel 30 according to the first embodiment. The lens holder 540 is formed of the same material as that of the lens holder 40 according to the first embodiment.

Like the barrel 30 according to the first embodiment, the barrel 530 is provided with the cylindrical portion 32 and provided with a cover portion 531 at one end of this cylindrical portion 32. The cover portion 531 is provided with a top surface 531a and an undersurface 531b, and provided with a through hole 531c that penetrates these surfaces. On the outer circumferential side of the cover portion 531, a step S38 which is lowered one step is provided along the circumference thereof. The step S38 is made up of a side face 538a and a bottom surface 538b.

The lens holder 540 is provided with a flat body portion 541 having a circular shape in a plan view. The body portion 541 is provided with mutually opposed surfaces: a top surface 541a and an undersurface 541b, and provided with a lens mounting hole 544 that penetrates these surfaces. The top surface 541a and the undersurface 541b are connected together via a side face 541c on the outer circumferential side.

An inside convex portion 542 and an outside convex portion 543 are provided on the undersurface 541b. The inside convex portion 542 is a portion that protrudes along the rim of the lens mounting hole 544. The outside convex portion 543 is a portion that is located away from the inside convex portion 542 and protrudes from the outer circumferential end of the body portion 541 in the same direction as the inside convex portion 542. FIG. 25 is a cross-sectional view, and both the inside convex portion 542 and the outside convex portion 543 are ring-shaped convex portions in a plan view.

The cover portion 531 is provided with a step S39 on the undersurface 531b inside the cylindrical portion 32. This step S39 is provided to mount the flat glass 250.

The inside convex portion 542 is fitted into the through hole 531c and the outside convex portion 543 is fitted into the step S38, and the lens holder 540 is thereby fitted into the barrel 530.

In the tenth embodiment, the lens holder 540 is fixed to the barrel 530 through thermal caulking utilizing a difference in linear expansion coefficients. The linear expansion coefficient of the material of the lens holder 540 is larger than the linear expansion coefficient of the material of the barrel 530. Therefore, the outside convex portion 543 is provided so that the circumference of the barrel 530 is covered with the lens holder 540 in order to perform thermal caulking in a process in which the lens holder 540 is cooled. Note that the flat glass 250 is attached on the barrel 530 side via the low melting point glass 251 by taking into consideration the fact that thermal caulking causes air tightness to deteriorate.

[Method for manufacturing apparatus of tenth embodiment]

FIG. 26 is a flowchart illustrating a method for manufacturing the optical module according to the tenth embodiment of the present invention. FIGS. 27A to 27F are time sequence diagrams illustrating manufacturing processes of the optical module according to the tenth embodiment of the present invention. The flowchart in FIG. 26 corresponds to the flowchart in FIG. 15 according to the fifth embodiment with step S301 replaced by step S505. Operation contents of the other steps are similar to those in the flowchart of FIG. 15 except in that the lens holder 540 and the barrel 530 are assembled instead of the barrel 230 and the lens holder 140.

In the flowchart shown in FIG. 26, the barrel 530 and the lens holder 540 are prepared as shown in FIG. 27A and FIG. 27B (step S300).

(Step S505)

In this case, both the lens holder 540 and the barrel 530 are heated, the inside convex portion 542 is fitted into the through hole 531c and the outside convex portion 543 is fitted into the step S38, and the lens holder 540 and the barrel 530 are thereby assembled together. The heating temperature is preferably set to 800° C. or above in the present embodiment. A thermal caulking effect can be achieved by cooling after the assembly. At this point in time, the lens 48 is not provided in the lens holder 540.

Next, as shown in FIG. 27C, the lens glass 47 is set in the lens mounting hole 544 (step S302). Next, as shown in FIG. 27D, the lens glass 47 is sandwiched between the metal dies using a pressing apparatus and lens molding is performed (step S303). As a result, the lens 48 is molded as shown in FIG. 27E.

Next, the flat glass 250 is prepared (step S304). The flat glass 250 is fixed to the undersurface 531b of the cover portion 531 and the low melting point glass 251 is melted (step S305). In this way, the lens cap 520 is completed as shown in FIG. 27F.

After that, like step S106 of the first embodiment, the barrel and the lens holder are assembled with the stem 12 on which the laser diode 17 or the like has already been mounted, the receptacle holder 18 and the receptacle 19, and the optical module is completed.

According to the lens cap 520 and the method for manufacturing the optical module provided therewith according to the tenth embodiment described so far, it is possible to perform thermal caulking utilizing a difference in linear expansion coefficients between parts and fix the lens holder 540 to the barrel 530. Furthermore, since air tightness may be insufficient with only thermal caulking, it is possible to fix the flat glass 250 with the low melting point glass 251 and secure air tightness.

Furthermore, thermal caulking can be realized using a glass furnace. This provides an advantage that the use of thermal caulking eliminates the necessity for preparing additional equipment such as a YAG welder or projection welding machine.

Eleventh Embodiment

An eleventh embodiment is the same as the tenth embodiment in that the lens cap 520 provided with the barrel 530 and lens holder 540 is manufactured and provided for an optical module. However, the manufacturing method of the lens cap 520 is different from that in the tenth embodiment.

FIG. 28 is a flowchart illustrating a method for manufacturing the optical module according to the eleventh embodiment of the present invention. FIGS. 29A to 29D are time sequence diagrams illustrating manufacturing processes of the optical module according to the eleventh embodiment of the present invention. The flowchart in FIG. 28 corresponds to the flowchart in FIG. 17 according to the sixth embodiment with step S301 changed. Operation contents of the other steps are similar to those in the flowchart in FIG. 17 except in that the lens holder 540 and barrel 530 are assembled instead of the barrel 230 and lens holder 140.

Figure 29:
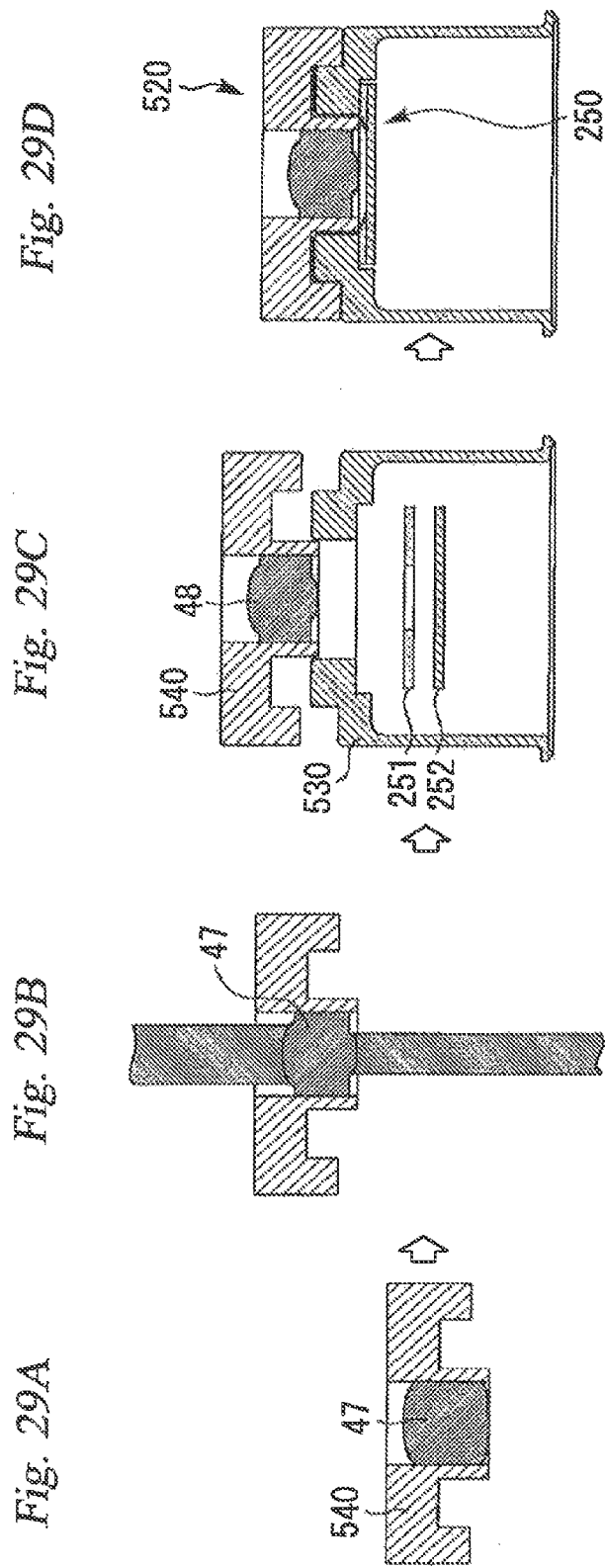

According to the flowchart in FIG. 28, the lens holder 540 is prepared first (step S351), and the lens glass 47 is set in this (step S302). This results in a state as shown in FIG. 29A. Next, as shown in FIG. 29B, the lens glass 47 is sandwiched between metal dies and lens molding is performed using a pressing apparatus (step S352).

Next, as shown in FIG. 29C, the barrel 530 is prepared (step S353) and the lens holder 540 is fitted into the barrel 530. The glass body 252 which is a component of the flat glass 250 and the low melting point glass 251 to fix the flat glass 250 are also prepared and attached to the barrel 530 (step S304).

Here, thermal caulking is performed (step S505). More specifically, the assembled barrel 530 and lens holder 540 are heated up to a low melting point glass melting temperature. With a temperature rise when glass is melted, the lens holder 540 and the barrel 530 thermally expand respectively. After that, the lens holder 540 and the barrel 530 are cooled and firmly fixed due to an effect of thermal caulking in the process of cooling. As a result, the lens cap 520 is completed as shown in FIG. 29D.

After that, like step S106 of the first embodiment, the barrel and the lens holder are assembled with the stem 12 on which the laser diode 17 or the like has already been mounted, the receptacle holder 18 and the receptacle 19, and the optical module is completed.

According to the method for manufacturing the lens cap 520 and the optical module provided therewith according to the eleventh embodiment described so far, it is possible to perform thermal caulking and fix the lens holder 540 to the barrel 530 in the same way as in the tenth embodiment.

Twelfth Embodiment

By fitting a part or whole of the lens holder into the barrel and utilizing a difference in linear expansion coefficients between these parts, each of the first to eleventh embodiments narrows the clearance between the lens holder and barrel, and thereby corrects the positional relation between these parts. However, the present invention is not limited to this. There may be an embodiment in which a part or whole of the lens holder is not fitted into the barrel.

FIG. 30 is a cross-sectional view illustrating an optical module lens cap 620 manufactured using a method for manufacturing an optical module according to a twelfth embodiment of the present invention. The lens cap 620 is provided with a barrel 630 and a lens holder 640. The barrel 630 is formed of the same material as that of the barrel 30 according to the first embodiment and the lens holder 640 is formed of the same material as that of the lens holder 40 according to the first embodiment.

The barrel 630 is provided with the cylindrical portion 32 as in the case of the barrel 30 of the first embodiment, a cover portion 631 is provided at one end of the cylindrical portion 32 and the other end of the cylindrical portion 32 is left open. The cover portion 631 is provided with a through hole 633.

In the lens cap 620 according to the twelfth embodiment, unlike the first to eleventh embodiments where the lens holder and the barrel are fitted with each other, a bottom surface 642 of the lens holder 640 is placed on a top surface 631a of the cover portion 631 in the barrel 630 and brazed. Both the bottom surface 642 and the top surface 631a are flat and are not provided with any step.

The lens cap 620 is manufactured using the method for manufacturing an optical module according to the first embodiment (see FIG. 4). That is, as in the case of step S101 of the flowchart in FIG. 4, the barrel 630 and the lens holder 640 are prepared. The brazing material 70 (not shown) is inserted between the top surface 631a of the cover portion 631 in the barrel 630 and the undersurface 642 of the lens holder 640, and the lens holder 640 is placed on the barrel 630.

Next, like step S102, the assembled barrel 630 and lens holder 640 are heated to melt the brazing material 70 and brazing is thereby performed. Thus, the barrel 630 and the lens holder 640 are united and the lens cap 620 before attaching the lens 48 is completed.

Like step S103, plating (Ni, Au or the like) may be applied to the brazed lens cap 620. Plating may be applied after molding the lens 48 (that is, after step S105 as will be described later).

Next, like step S104, the lens glass 47 is fitted into the lens mounting hole 44.

Next, like step S105, the lens glass 47 is sandwiched between metal dies and the lens 48 is press-molded using a pressing apparatus. In this case, positioning of press molding is performed using the barrel 630 as a reference.

After performing lens molding at a high temperature of 600° C. to 800° C., the lens is cooled. The lens 48 is thereby fitted into the lens holder 640 and the lens cap 620 is completed. The lens 48 is fixed through thermal caulking due to a difference in the amount of thermal contraction between the materials of the lens glass 47 and the lens holder 640. Using the material having a large linear expansion coefficient for the lens holder 640, it is possible to achieve a thermal caulking effect after molding the lens glass 47.

After that, like step S106, the lens cap 620 manufactured in the steps so far is placed on the stem 12 on which the laser diode 17 or the like has already been mounted, and fixed. Further, by attaching the receptacle holder 18 and the receptacle 19, the optical module is completed.

According to the twelfth embodiment as described so far, after assembling the barrel 630 and the lens holder 640 of different linear expansion coefficients, it is possible to press-mold the lens glass into the lens holder 640 having a high thermal expansion coefficient while positioning the press molding using the barrel 630 having a smaller linear expansion coefficient as a reference.

The features and advantages of the present invention may be summarized as follows. According to the first invention, a method for manufacturing an optical module is provided which can reduce a positional variation of the lens while securing high air tightness by appropriately determining assembly/lens molding order and references in consideration of differences in linear expansion coefficients. According to the second and third inventions, a method for manufacturing an optical module is provided which can improve positioning accuracy among parts by appropriately determining manufacturing steps in consideration of differences in linear expansion coefficients. According to the fourth and fifth inventions, an optical module is provided which improves positioning accuracy among parts using differences in linear expansion coefficients by fitting a barrel with a lens holder having different linear expansion coefficients.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2013-197214, filed on Sep. 24, 2013, including specification, claims, drawings, and summary, on which the Convention priority of the present application is based, is incorporated herein by reference in its entirety.

What is claimed is:

1. A method for manufacturing an optical module, comprising:
preparing a barrel and a lens holder, the barrel comprising a cylindrical portion and a cover portion located at a first end of the cylindrical portion and including a through hole, wherein the cylindrical portion has a second end that is open, the barrel has a first linear expansion coefficient, and the lens holder comprises a lens mounting hole and has a second linear expansion coefficient that is larger than the first linear expansion coefficient;
assembling the barrel and the lens holder so that the through hole is aligned with the lens mounting hole; and
press-molding lens glass having a third linear expansion coefficient, which is smaller than the second linear expansion coefficient, into the lens mounting hole while positioning the barrel and lens holder, using the barrel, and cooling the lens glass, thereby providing a lens in the lens holder.

2. The method for manufacturing an optical module according to claim 1, wherein, in assembling the barrel and the lens holder, applying a brazing layer between the cover portion and the lens holder.

3. The method for manufacturing an optical module according to claim 2, including providing a step at a brazing region between the cover portion and the lens holder, and a rim of the lens mounting hole, wherein the step is convex at the rim.

4. The method for manufacturing an optical module according to claim 2, including plating a layer in the barrel and the lens holder covering the brazing layer, after assembling the barrel and the lens holder.

5. The method for manufacturing an optical module according to claim 1, wherein, in assembling the barrel and the lens holder, projection welding the cover portion and the lens holder.

6. The method for manufacturing an optical module according to claim 1, wherein, in assembling the barrel and the lens holder, thermally caulking the barrel and the lens holder.

7. The method for manufacturing an optical module according to claim 1, including fitting the lens holder into the cylindrical portion of the barrel.

8. The method for manufacturing an optical module according to claim 1, wherein at least one of the barrel and the lens holder comprises a thin-walled portion in a part where the barrel contacts the lens holder, and including, in assembling the barrel and the lens holder, penetration laser welding the thin-walled portion.

9. A method for manufacturing an optical module, comprising:
preparing a barrel and a lens holder, the barrel comprising a cylindrical portion and a cover portion located at a first end of the cylindrical portion and including a through hole, wherein the cylindrical portion has a second end that is open, the barrel has a first linear expansion coefficient, and the lens holder comprises a lens mounting hole and has a second linear expansion coefficient that is larger than the first linear expansion coefficient;
assembling the barrel and the lens holder so that the through hole is aligned with the lens mounting hole;
providing a lens in the lens holder before or after assembling the barrel and the lens holder, wherein the lens holder comprises a convex portion along a rim of the lens mounting hole; and
fitting the convex portion into the through hole.

10. The method for manufacturing an optical module according to claim 9, wherein, in providing a lens molding in the lens holder, press-molding lens glass having a third linear expansion coefficient, which is smaller than the second linear expansion coefficient, into the lens mounting hole while positioning the barrel and the lens holder, after assembling the barrel and the lens holder, and cooling the lens glass.

11. An optical module comprising:
- a barrel comprising a cylindrical portion and a cover portion located at a first end of the cylindrical portion, wherein the cover portion includes a through hole, a second end of the cylindrical portion is open, and the barrel has a first linear expansion coefficient;
- a lens holder comprising a lens mounting hole and having a second linear expansion coefficient which is larger than the first linear expansion coefficient;
- a lens, formed by press molding lens glass, having a third linear expansion coefficient, which is smaller than the second linear expansion coefficient, located in the lens mounting hole; and
- a stem comprising a top surface and an optical element located on the top surface, wherein the optical element is covered by the barrel, and the second end is connected to the top surface, wherein
- the lens holder comprises a convex portion along a rim of the lens mounting hole, and
- the convex portion is fitted in the through hole.

12. The optical module according to claim 11, further comprising a brazing layer by which the cover portion and the lens holder are brazed together.

13. The optical module according to claim 12, further comprising a step located in a brazing region, between the cover portion and the lens holder, and a rim of the lens mounting hole, wherein the step is convex on a rim side.

14. The optical module according to claim 12, further comprising a plating layer in the barrel and the lens holder covering the brazing layer.

15. The optical module according to claim 11, further comprising a projection welding portion that connects the cover portion to the lens holder.

16. The optical module according to claim 11, wherein the barrel and the lens holder are thermally caulked.

17. The optical module according to claim 11, wherein
- at least one of the barrel and the lens holder comprises a thin-walled portion where the barrel contacts the lens holder, and
- the thin-walled portion is penetration laser welded.

* * * * *